United States Patent [19]

Hirooka et al.

[11] Patent Number: 5,325,935
[45] Date of Patent: Jul. 5, 1994

[54] REACH FORKLIFT

[75] Inventors: Shigeru Hirooka, Kyoto; Ikuya Katanaya, Nara; Koji Orita; Shinobu Tanaka, both of Kyoto, all of Japan

[73] Assignee: Nippon Yusoki Co., Ltd., Kyoto, Japan

[21] Appl. No.: 63,189

[22] Filed: May 18, 1993

[51] Int. Cl.5 ............................................. B62D 61/06
[52] U.S. Cl. ................................... 180/211; 180/140; 180/151; 180/79.1; 364/424.05
[58] Field of Search ............... 180/211, 212, 213, 214, 180/140, 908, 151; 280/92, 98, 99, 103; 364/424.05

[56] References Cited

U.S. PATENT DOCUMENTS

| | | | |
|---|---|---|---|
| 1,716,732 | 6/1929 | Mossay | 180/216 |
| 2,618,396 | 11/1952 | Belt | 180/211 |
| 3,556,241 | 1/1971 | Mitchell | 180/140 |
| 3,998,288 | 12/1976 | Aoki | 180/211 |
| 4,775,024 | 10/1988 | Pircher | 180/214 |
| 4,893,689 | 1/1990 | Laurich-Trost | 180/140 |

FOREIGN PATENT DOCUMENTS

| | | |
|---|---|---|
| 0512591 | 11/1992 | European Pat. Off. . |
| 3215425 | 10/1983 | Fed. Rep. of Germany . |
| 3911453 | 10/1989 | Fed. Rep. of Germany . |
| 3942494 | 7/1990 | Fed. Rep. of Germany . |
| 1026020 | 4/1953 | France .................... 180/211 |
| 1257493 | 2/1961 | France . |
| 2201666 | 4/1974 | France . |
| 1546329 | 2/1990 | U.S.S.R. ................. 180/211 |
| 2232941 | 1/1991 | United Kingdom . |

OTHER PUBLICATIONS

Patent Abstracts of Japan, vol. 16, No. 135 (M-1230) 6 Apr. 1992 & JP-A-03 295 768 (Nippon Yusoki Co Ltd) 26 Dec. 1991 * abstract * * figures *.

Primary Examiner—Richard M. Camby
Assistant Examiner—Kevin Hurley
Attorney, Agent, or Firm—Cushman, Darby & Cushman

[57] ABSTRACT

A reach forklift comprises: a forklift body; left and right straddle arms; a pair of load wheels supported in a steerable manner in the vicinity of front ends of the left and right straddle arms, respectively; driving means for steering the load wheels, the load wheels and the driving means being housed in the straddle arms; a drive wheel disposed in a rear portion of the forklift body; and a steering wheel for steering the drive wheel; steering angle detecting means for detecting steering angles of the left and right load wheels and the drive wheel. Each of the left and right straddle arms comprises: a bracket which rotatably supports a steering shaft, the center of the steering shaft being positioned at an outer position in the width direction of the forklift body, the bracket being fixed to a lower face of the steering shaft, supporting the load wheels at an outer position of the forklift body, and rotatably supporting the center of the load wheel in the width direction of the load wheel, the center of the load wheel being separated from the center of the steering shaft by a predetermined distance; a gear which is fixed to the bracket and formed into a sector shape, the arc portion of the sector gear being directed to the center of the forklift; and a driving gear which engages with the sector gear and is driven by the driving means, the driving gear being positioned in the side of the center of the forklift.

9 Claims, 30 Drawing Sheets

REACH FORKLIFT

BACKGROUND OF THE INVENTION

1. Field of the Invention

This invention relates to a reach forklift, and more particularly to a reach forklift which has steerable load wheels and is mainly intended to attain an improvement in the efficiency of cargo work.

2. Prior Art

Conventionally, a multi-directional vehicle shown in FIGS. 57 and 58 is proposed. When the vehicle travels in the directions indicated by arrow A, caster wheels p and m are turned and then fixed in these directions so that they cannot make a turn, and a caster wheel n is allowed to turn, by hydraulically controlling cylinders provided for these wheels. In this state, a steered and driving wheel 1 is turned toward a desired direction, so that Ackerman steering can be effected.

When the vehicle travels in the directions indicated by arrow B, the caster wheels p and n are turned and then fixed in these directions so that they cannot make a turn, and the caster wheel m is allowed to turn, by hydraulically controlling the cylinders. In this state, the steered and driving wheel 1 is turned toward a desired direction, so that Ackerman steering can be effected in the same manner as described above.

In the above-described vehicle, however, the cylinders s1 and s2, link levers and the like are housed in straddle arms, so that the left and right straddle arms become larger in width. The large width of straddle arms is quite inconvenient because such a forklift is required to travel along very narrow pathways in a warehouse.

When the travel direction is to be changed from A to B or vice versa, the vehicle a is first stopped, and then a button switch or the like is pressed. The necessity of individually performing such mode switching operations makes it impossible to continuously change the travel direction. When the vehicle is steered according to the theory of Ackerman-Jeantaud, the travel direction is limited to those indicated by A or B, and the attitude of the vehicle cannot be changed with respect to other directions (for example, directions inclined at 45 degrees away from the directions of arrow A). Furthermore, the steering of the vehicle cannot be controlled in such a manner that the turning center thereof is continuously changed and located on the approximate center of the body of the vehicle. Thus, the vehicle cannot make a small turn.

SUMMARY OF THE INVENTION

The invention has been conducted in view of the above-mentioned problems, and has an object of providing a reach forklift which can be operated based on the driverbility of an ordinary reach forklift and in which the steering of load wheels supported by straddle arms can be realized without increasing the width of the straddle arms or with an extremely reduced width of the straddle arms.

Another object of the invention is to provide a reach forklift in which the steering of left and right load wheels can be controlled in such a manner that the forklift can smoothly turn in accordance with the theory of Ackerman-Jeantaud and also can make a small turn, thereby improving the efficiency of cargo work.

A further object of the invention is to provide a reach forklift which allows its travel direction to be freely changed, and which can change the attitude angle with respect to the changed directions and travel with an extremely high degree of freedom, thereby improving the efficiency of cargo work.

DETAILED DESCRIPTION OF THE PREFERRED EMBODIMENTS

Figure 4:
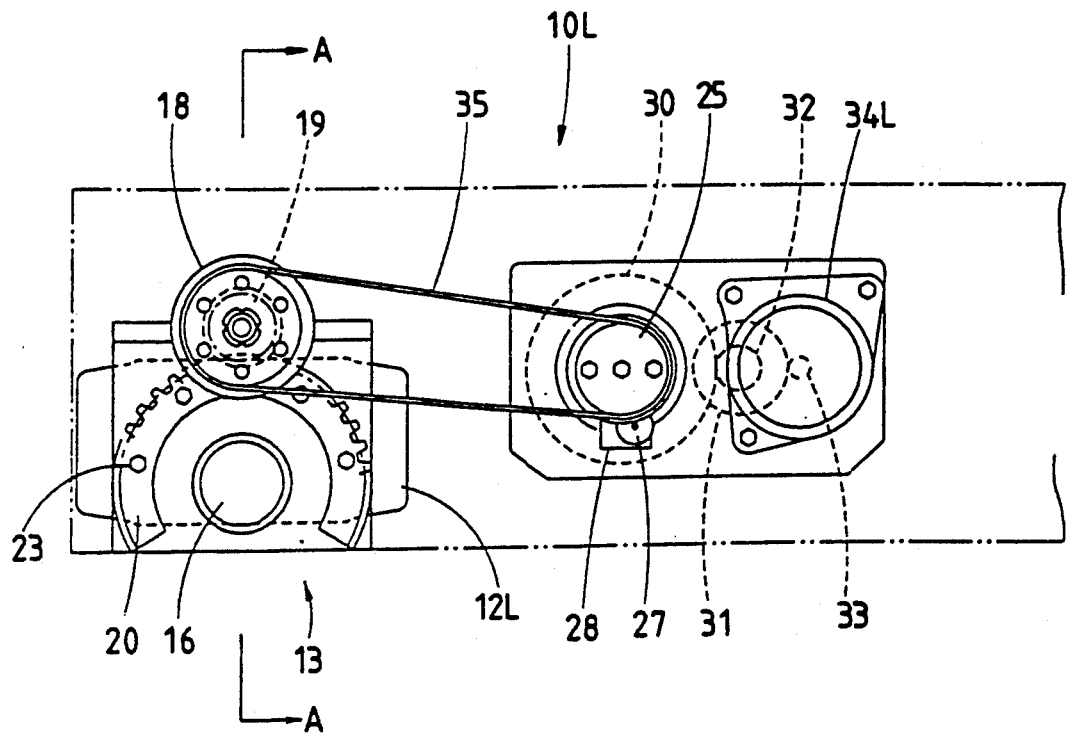
FIG. 4 is a front view of the left load wheel.

Embodiments of the invention will be described with reference to the attached drawings. First, a reach forklift according to one embodiment of the invention will be described with reference to FIGS. 1 to 5. FIG. 2 is a sectional view taken along the line A—A shown in FIG. 4.

According to the invention, in a reach forklift having left and right load wheels which can be steered, the width of left and right straddle arms housing these load wheels can be reduced.

Figure 1:
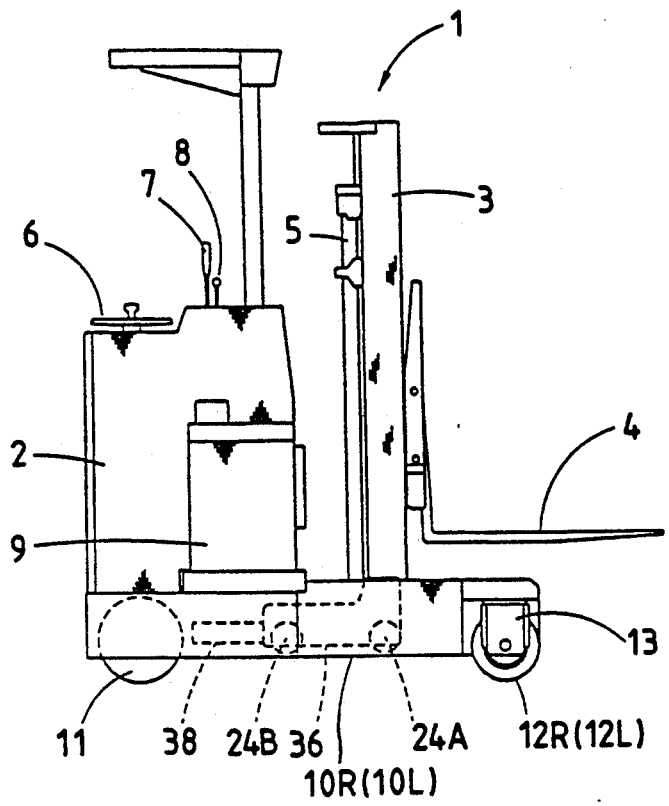
FIG. 1 is a side elevation view of a reach forklift according to the invention.
Figure 2:
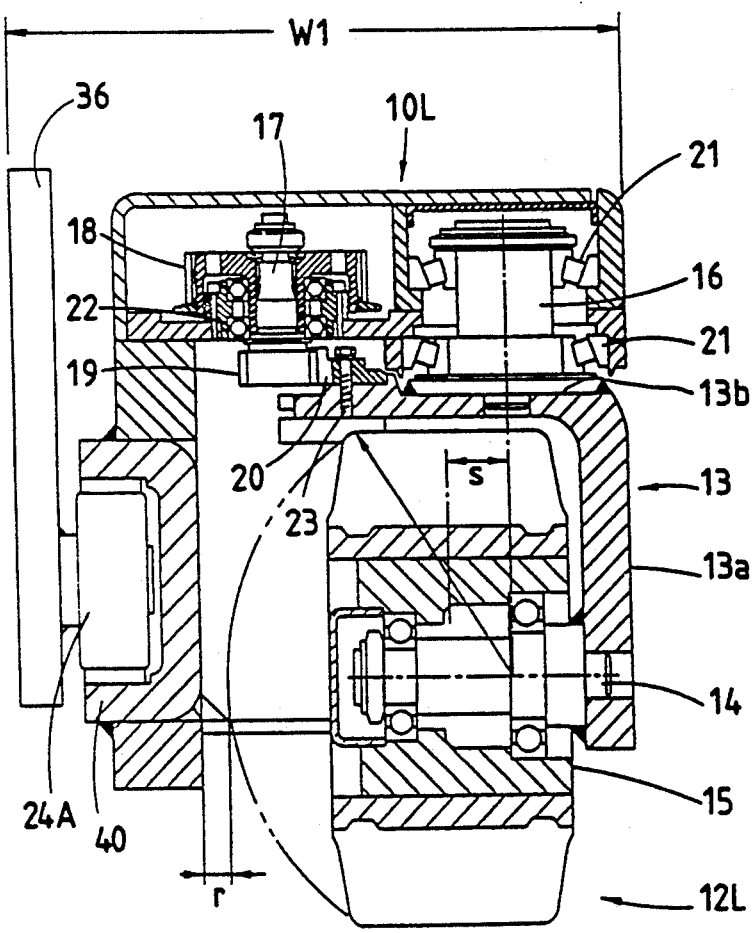
FIG. 2 is a sectional view taken along the line A—A shown in FIG. 4.
Figure 3:
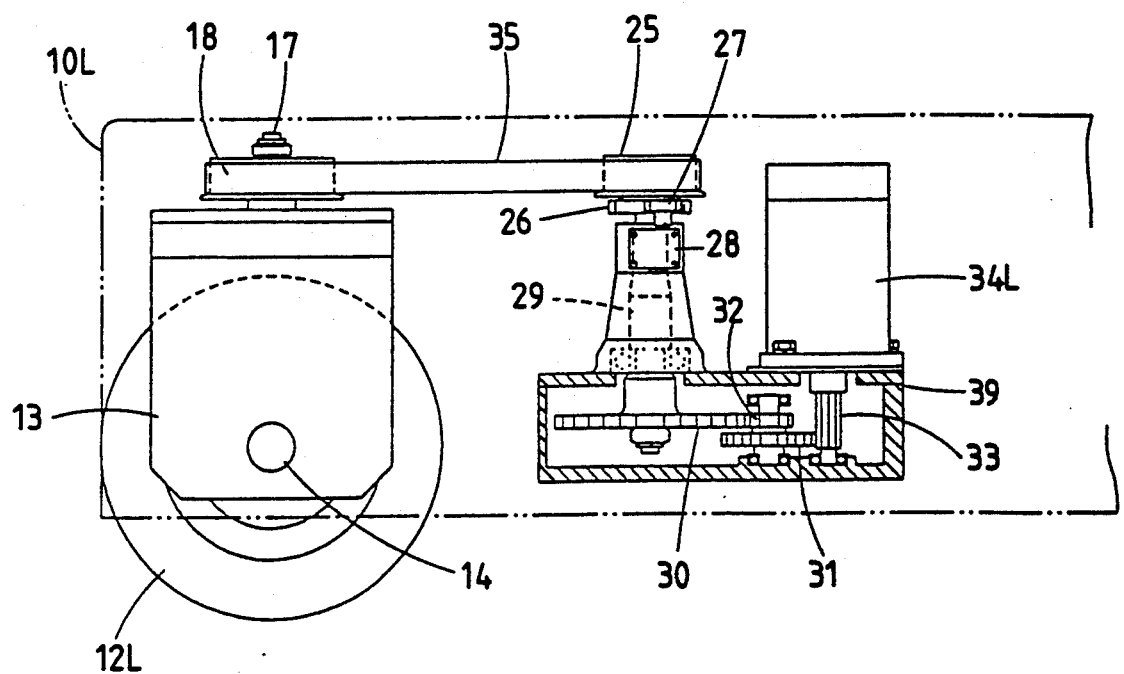
FIG. 3 is a side elevation view of a left load wheel.

As shown in FIG. 1, a reach forklift (hereinafter, referred to as "forklift") 1 comprises a body 2, left and right straddle arms 10L and 10R protruding from the body 2, and load wheels 12L and 12R respectively supported by the straddle arms 10L and 10R in such a manner that they can be steered. The body 2 has a drive wheel 11 which can be steered by a steering wheel 6.

Between the straddle arms 10L and 10R, mounted is a carriage 36 which can be slid back and forth by a reach cylinder 38. On the carriage 36, a mast 3 is mounted. Load-carrying means 4 such as a fork or one of various other attachments is engaged with the mast 3 so that the load-carrying means 4 can be moved up and down by a lift cylinder 5. To the carriage 36, rollers 24A and 24B are attached in such a manner that they can roll along a rail formed on the inner side wall of the straddle arm 10L. Reference numeral 7 designates a loading operation lever for operating the load-carrying means 4, 8 designates a driving operation lever for instructing the acceleration of the drive wheel, and 9 designates a battery.

Next, the mechanism of the load wheels will be described in detail. The left load wheel 12L is attached to a wheel 15 which is rotatably supported on a supporting shaft 14 by means of bearings. The supporting shaft 14 is welded to a vertical downward portion 13a of a bracket 13 which is approximately L-shaped in its front view. The outer side walls of the vertical portion 13a and straddle arm 10L are substantially on the same vertical plane. On a horizontal portion 13b of the bracket 13, an upwardly-protruding steering shaft 16 is rotatably supported by a pair of tapered roller bearings 21. The tapered roller bearings 21 are so disposed that their rear sides face each other. Thus, they can support a moment load generated in the steering shaft 16. The steering shaft 16 is located as close to the outer side of the body of the forklift as possible.

To the inner end of the horizontal portion 13b of the bracket 13, a sector gear 20 is secured by means of a bolt 23. The sector gear 20 engages with a pinion 19 into which a shaft 17 is fitted. Since the gear 20 has the shape of a sector of a circle, a sufficient reduction gear ratio can be obtained and the width of the straddle arm 10L can be made small. The sector gear 20 has an arc portion corresponding to an angle of about 230 degrees, and allows the load wheel 12L to turn toward the left and right each at an angle of about 115 degrees.

The horizontal portion 13b of the bracket 13 is not in contact with the straddle arm 10L, so that the entire load imposed on the steering shaft 16 is applied to the tapered roller bearings 21.

The shaft 17 and the steering shaft 16 are juxtaposed, and the shaft 17 is rotatably supported by a boss 22. A timing pulley 18 is fixed to the upper end portion of the shaft 17. As seen from FIG. 3, a steering motor 34L is securely mounted inside the straddle arm 10L so as to rotate a drive shaft 29 via a pinion 33 attached to the shaft of the motor, a single reduction gear 31, an idle gear 32 attached to the shaft of the single reduction gear 31, and a double reduction gear 30. These gears are housed in a gear case 39 filled with gear oil.

Furthermore, to the upper end of the drive shaft 29, attached is a timing pulley 25 which is smaller in diameter than the timing pulley 18 attached to the shaft 17.

A timing belt 35 is wound around both the timing pulleys 18 and 25, so that the torque of the steering motor 34L is reduced by the gears and transmitted to the timing pulley 18 of the shaft 17, thereby enabling the load wheel 12L to be steered. The reference numeral 28 in FIGS. 3 and 4 designates an encoder. The end of a detection shaft of the encoder 28 is provided with a gear 27 which engages with a gear 26 fixed to the drive shaft 29 so that the steering angle of the load wheel 12L can be detected.

The above-described components such as the steering motor 34L, timing pulleys 18 and 25, and steering shaft 16 are all housed in the straddle arm 10L. The configuration of the right load wheel is substantially the same as that of the left load wheel described above. That is, the left and right load wheels are so constructed as to be symmetric with respect to the center line of the body of the forklift 1.

Figure 5:
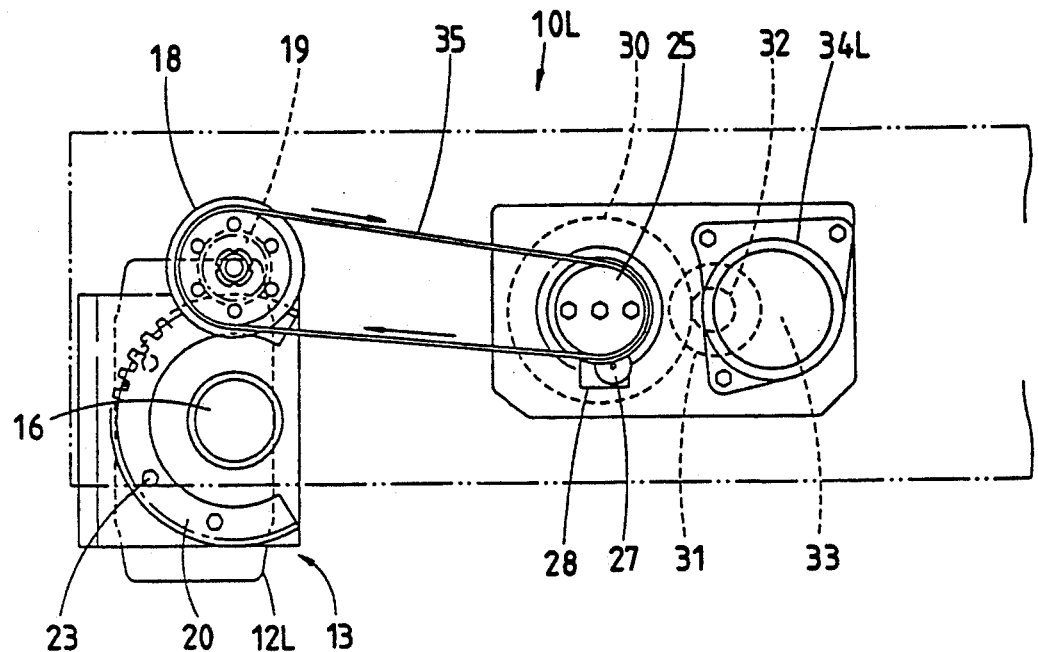
FIG. 5 is a front view of the left load wheel.

When the steering motor 34L is so driven as to rotate the timing belt 35 in the direction shown in FIG. 5, therefore, the torque of the steering motor 34L is transmitted through the driving gear 19 to the sector gear 20. This results in that the bracket 13 on which the load wheel 12L is rotatably supported can turn about its steering axis. This steering axis of the bracket 13 is the axis of the steering shaft 16.

FIG. 5 shows the load wheel 12L in the state of its maximum steering angle. When this state of the load wheel 12L is detected by the encoder 28, the steering motor 34L may be stopped. Alternatively, other devices such as a mechanical stopper may be provided in order to limit the steering angle. It is needless to say that, when the steering motor 34L is driven to rotate in the direction opposite to that shown in FIG. 5, the load wheel 12L is also turned in the opposite direction.

Figure 6:
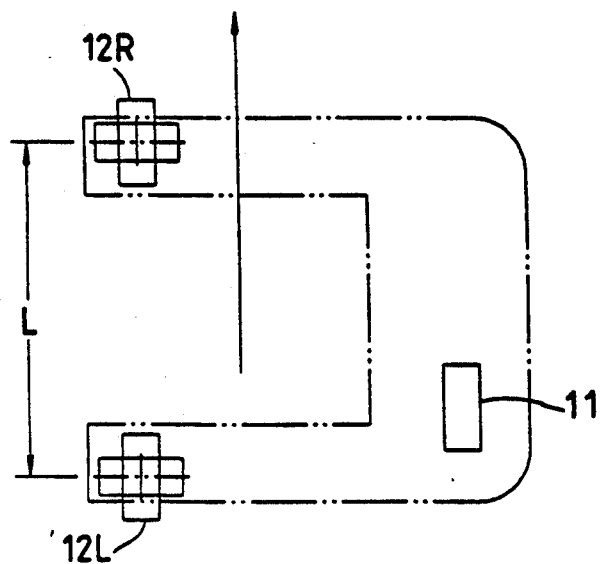
FIG. 6 is a plan view illustrating a wheelbase for a lateral travel in the case where an offset of load wheels is not provided.
Figure 7:
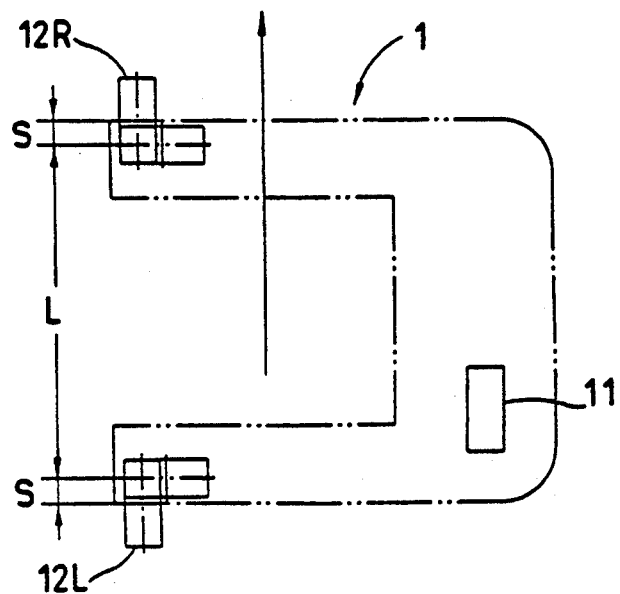
FIG. 7 is a plan view illustrating a wheelbase for a lateral travel in the case where an offset of load wheels is provided.

Furthermore, as seen from FIG. 2, the center line of the load wheel 12L is displaced from the turning center of the steering shaft 16 by a distance s which is a so-called king pin offset. This offset is extremely important for the following reasons: In the case where the forklift travels in a lateral direction without changing the direction of the body as shown in FIGS. 6 and 7, if the steering center coincides with the center line of the load wheel 12L, the wheelbase is L, and, in contrast, if the offset distance s is provided as described above, it is possible to obtain a longer wheelbase of L+2s.

Moreover, when the load wheels are steered with the forklift 1 kept stationary, i.e., in the case of so-called stationary swing, the provision of the offset reduces the friction between the load wheel and the ground, so that the load wheel can easily roll toward a desired direction, resulting in a reduction in the steering torque.

Furthermore, even when the load wheel 12L is turned by an angle of 90 degrees from the position shown in FIG. 2, the steering of the load wheel 12L can be ensured because a clearance r is provided between the load wheel 12L and the side wall of the rail 40 of the straddle arm 10L.

Figure 8:
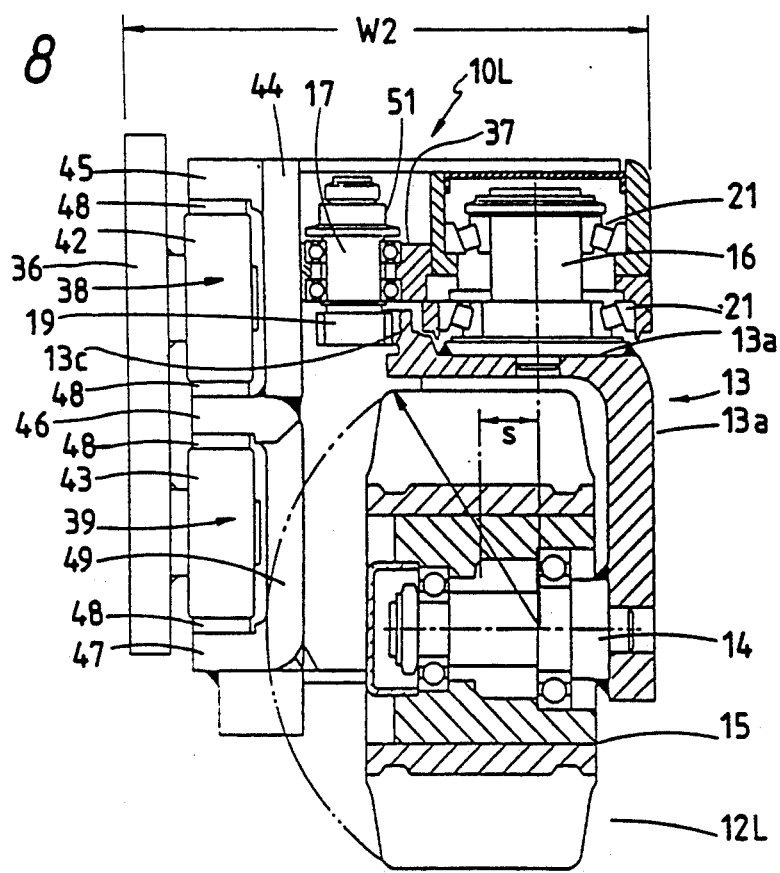
FIG. 8 is a front view of the left load wheel.
Figure 9:
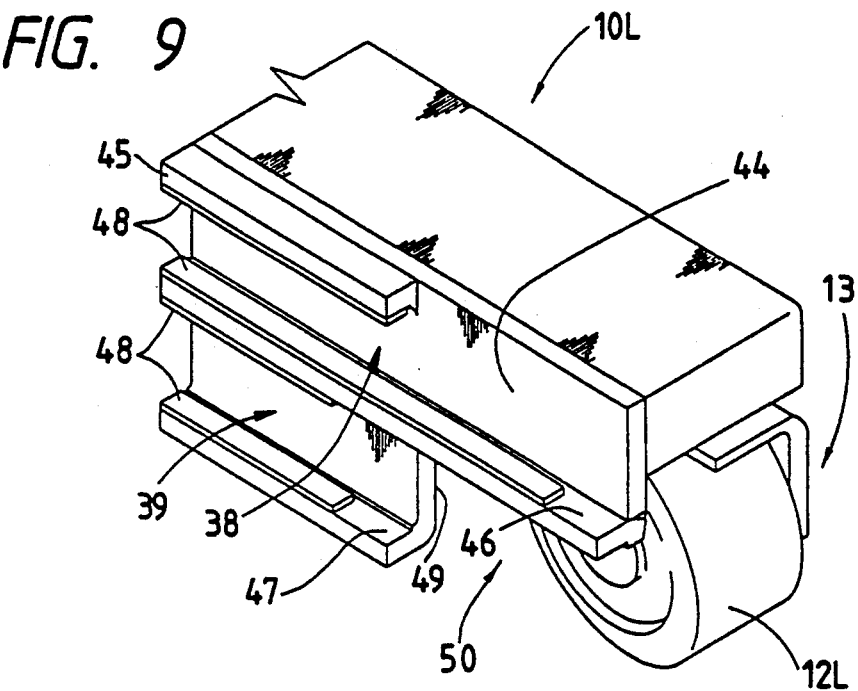
FIG. 9 is a perspective view of a straddle arm.

Next, a forklift according to another embodiment of the invention will be described with reference to FIGS. 8 to 11. In FIGS. 8 to 11, the components identical with those of the above-described embodiment are designated by the same reference numerals, and their detailed description is omitted. According to this invention, the width of the straddle arms can be further reduced as compared with the above-described invention. As shown in FIG. 9, in this embodiment, upper and lower grooves 38 and 39 are formed on one side wall of the straddle arm 10L which side wall faces the center of the body of the forklift.

The structure of the grooves 38 and 39 will be described. To the inner wall of the straddle arm 10L, an inner plate 44 is welded. An upper rail 45 and a middle rail 46 are fixed to the upper and lower ends of the inner plate 44, thereby constituting the upper groove 38. In this embodiment, the upper rail 45 does not extend to the front end of the straddle arm 40. However, this configuration of the upper rail 45 should not be construed as restricting the scope of the invention.

To the lower end of the inner plate 44, welded is a lower plate 49 provided with a lower rail 47 so as to have a substantially "L"-shaped section. The middle rail 46 and the lower rail 47 constitute the lower groove 39. In order to prevent wear of the rails, liners 48 are attached to the sliding faces of the rails.

The front end of the lower plate 49 is positioned behind that of the upper plate 44 to form a space 50, so that the lower plate 49 does not interfere with the load wheel 12L under steering. Therefore, even when the load wheel 12L turns toward the inside of the truck body as shown by the two-dot chain line in FIG. 8, the rails will not interfere with the load wheel 12L. In this manner, as shown in FIG. 8, the width W2 of the straddle arm 40 can be made smaller as compared with the above-described embodiment.

Next, the carriage 36 supporting the mast 3 thereon will be described with reference to FIGS. 10 and 11. On both the side walls of the carriage 36, a front roller 42 and rear roller 43 are rotatably supported. Each of the front rollers 42 is supported on the upper portion of the carriage 36 so that it rolls along the upper groove 38. Each of the rear rollers 43 is supported on the lower portion of the carriage 36 so that it rolls along the lower groove 39.

Figure 10:
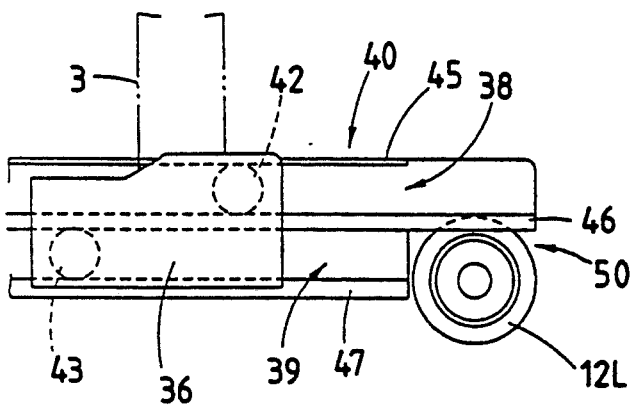
FIG. 10 is a side elevation view of the straddle arm.
Figure 11:
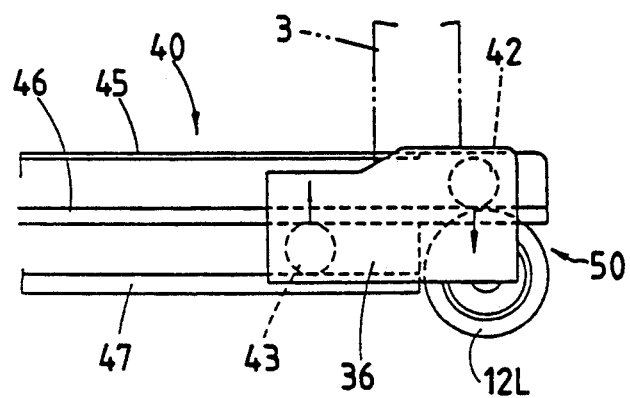
FIG. 11 is a side elevation view of the straddle arm.

FIG. 10 shows the state where the mast 3 has been retracted toward the body 2, or a so-called reach-in state, and FIG. 11 shows the state where the mast 3 has been moved forward toward the load wheel 12L, or a so-called reach-out state. Thus, although the front end of the lower groove 39 is positioned behind that of the upper groove 38, the essential operations of a reach forklift, i.e., the reach-in and reach-out operations can be ensured.

The reason why the upper rail 45 does not extend to the front end of the straddle arm 40 is as follows: As shown in FIG. 11, the weight of a load imposed on the mast 3 applies a downward force to the front roller 42 and an upward force to the rear roller 43. Accordingly, it is not necessary to provide a rail on the upper side of the front end portion of the upper plate 44.

A further embodiment of the invention will be described. This invention has been accomplished with objects of: enabling a natural steering operation of a reach forklift with steerable left and right load wheels; achieving a steering control which enables the forklift to make a small turn in response to the operation of its steering wheel; and fully satisfying the theory of Ackerman-Jeantaud to maintain a smooth steering operation.

Figure 12:
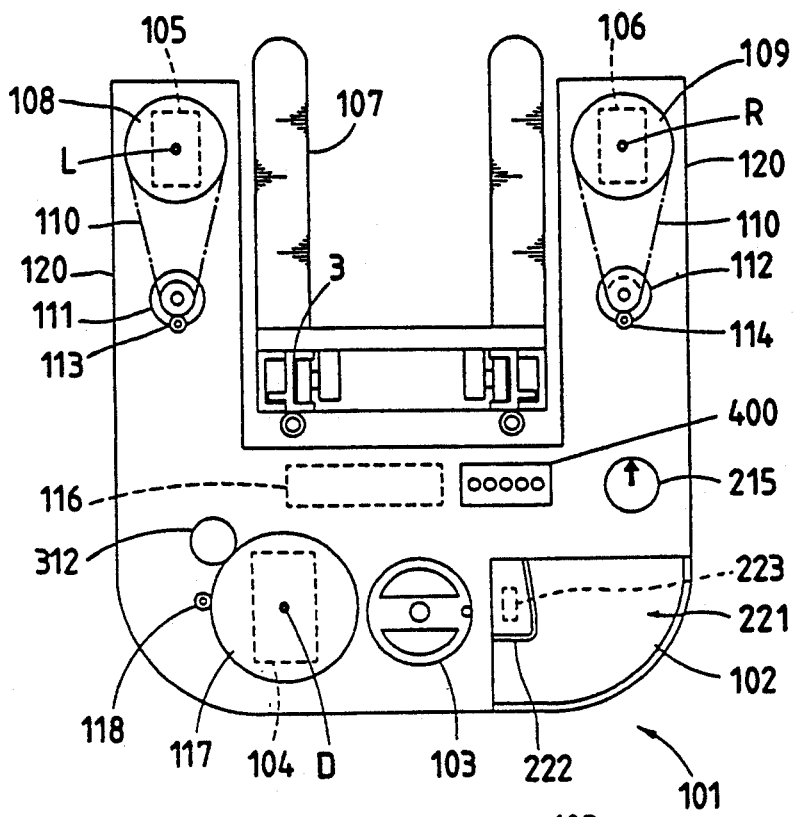
FIG. 12 is a plan view showing a reach forklift which is another embodiment of the invention.

FIG. 12 illustrates an example of the configuration of a reach forklift with steerable left and right load wheels (hereinafter, referred to as "forklift") of this embodiment. The forklift 101 comprises a body 102, left and right straddle arms 120 protruding from the body 102, and load wheels 106 and 105 respectively supported by the left and right straddle arms 120 in such a manner that they can be steered. The body 102 has a drive wheel 104 which can be steered by a steering wheel 103.

The drive wheel 104 is mounted on the body 102, or more specifically, supported on a rotary gear 117 which is rotatable and mechanically linked to the steering wheel 103. The rotary gear 117 is provided with a potentiometer 118 which can detect the degree of rotation of the rotary gear 117 by measuring a voltage corresponding to the rotation degree. On the basis of the thus detected degree of rotation, the steering angle of the drive wheel 104 can be determined.

A caster wheel (not shown) is provided in the side of the drive wheel 104, in order to ensure the travel stability. Between the straddle arms 120, mounted is load-carrying means 107 which can slide back and forth and can be vertically moved by a lift cylinder (not shown).

Figure 13:
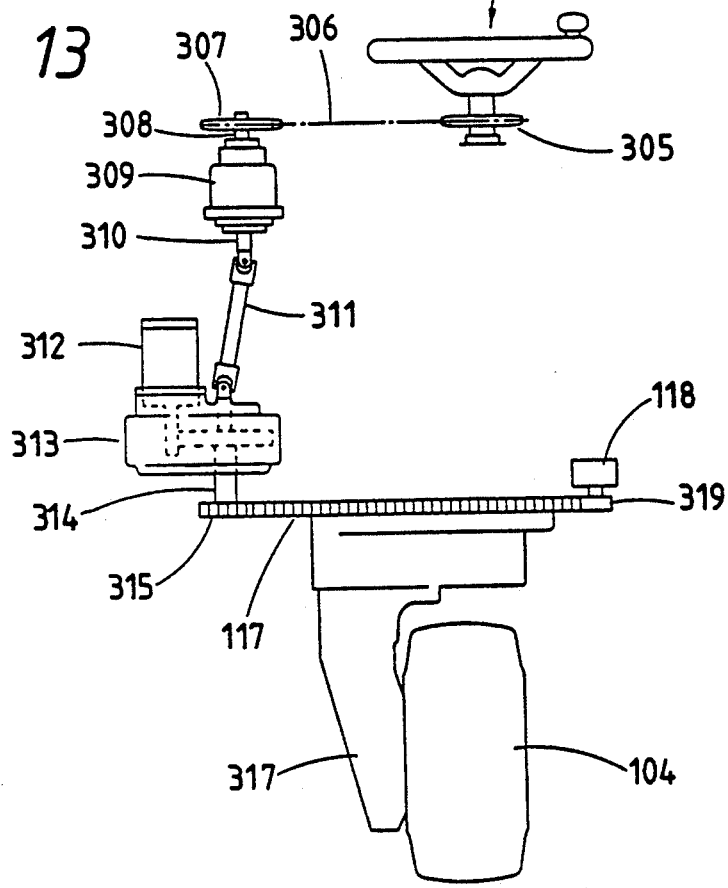
FIG. 13 is a diagram illustrating the steering mechanism for a drive wheel.

The drive wheel 104 can be steered by the steering wheel 103 in the following manner: As shown in FIG. 13, steering torque applied to the steering wheel 103 is transmitted from a sprocket 305 to another sprocket 307 through a chain 306, and further transmitted through an input shaft 308 fixed to the sprocket 307, a steering torque detection device 309, an output shaft 310, a universal joint 311 and a drive shaft 314, to a driving gear 315, thereby rotating the rotary gear 117.

A rotary gear case 317 on which the drive wheel 104 is rotatably supported is fixed to the rotary gear 117. The steering torque detection device 309 electrically detects the relative torsion between the input shaft 308 and the output shaft 310 to generate a steering torque signal. On the basis of the steering torque signal, the power steering motor 312 is driven to provide assist torque to the drive, shaft 314 through a gear case 313 containing a reduction gear mechanism. In this manner, the steering torque is reduced.

In FIG. 13, a detection gear 319 of a steering angle detection device 118 comprising a potentiometer and the like engages with the rotary gear 117, so that the steering angle of the drive wheel 104 can be detected.

The drive wheel 104 is further provided with a well-known brake device which is not shown. The brake device is a so-called deadman brake which is released when a brake pedal 222 provided in an operator cab 221 is pressed down and which is actuated when the operator's foot is removed from the brake pedal 222. The brake pedal 222 is provided with a limit switch 223 which functions as brake operation detecting means for detecting the pressing state of the brake pedal 222. The function of the limit switch will be described later.

The steerable load wheels 105 and 106 are respectively supported on rotary brackets 108 and 109 in such a manner that they can be turned with respect to the straddle arms 120. To the rotary brackets 108 and 109, steering motors 111 and 112 are respectively linked by transmission means 110 such as chains, belts or the like. When the steering motors 111 and 112 are rotated, therefore, the left and right load wheels 105 and 106 can be turned about steering centers L and R, respectively. In this embodiment, the centers L and R of the load wheels 105 and 106 serve as their respective steering centers. The steering centers may be located at other positions so that a so-called king pin offset of a predetermined length is provided as described above.

Potentiometers 113 and 114 are respectively attached to the output shafts of the steering motors 111 and 112 to detect their degree of rotation, so that the steering angles of the load wheels 105 and 106 can be determined.

The body 102 is provided with a control device 116, a travel mode select switch (hereinafter, referred to as "select switch") 400, and a travel angle input device 215. The travel angle input device 215 comprises a rotary-type potentiometer or the like, and is preferably located in the vicinity of the operator cab 221 so that the operator can set a desired travel angle. The operator can arbitrarily select one of plural travel modes through the select switch 400.

As shown in FIG. 12, the travel angle input device 215 has an arrow marked on the operation panel. The arrow indicates the travel direction so that the operator can easily recognize the current travel direction of the forklift 101. This will be described in detail later.

Figure 14:
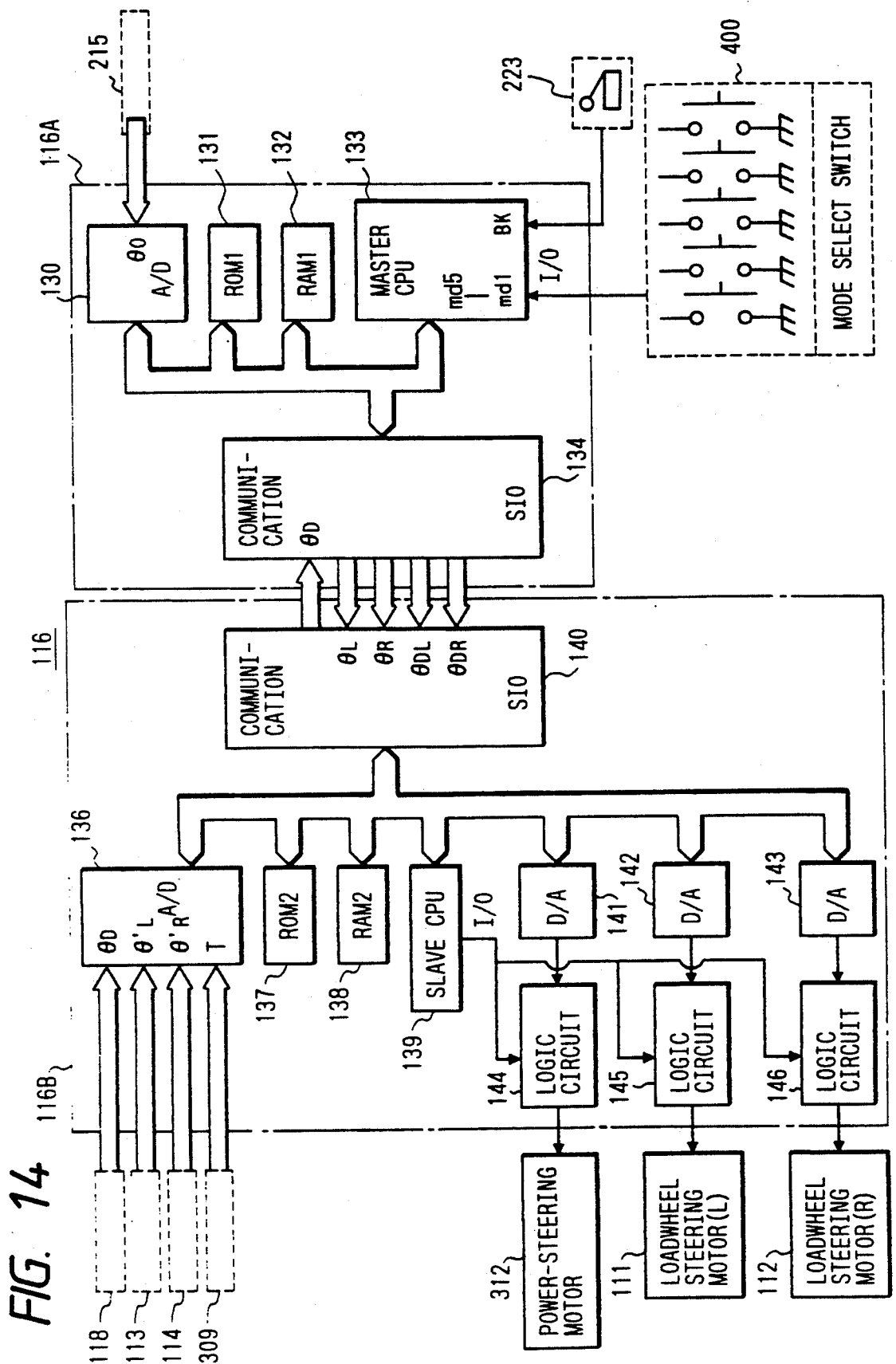
FIG. 14 is a block diagram showing the control device according to the invention.

The control device 116 comprises, as shown in FIG. 14, a master control section 116A and a steering control section 116B which are connected in such a manner that they can communicate with each other.

The master control section 116A comprises an A/D converter 130, a ROM1 131 for storing programs or the like, a RAM1 132 serving as a working storage, a master CPU 133 which is a microprocessor, and a serial I/O port (SIO) 134 for performing a serial transmission with..the steering control section 116B.

The A/D converter 130 receives a travel angle signal $\theta_O$ from the travel angle input device 215 and converts it into digital data.

The master CPU receives through its I/O port a brake detection signal $B_K$ from the limit switch 223 functioning as brake operation detecting means, and also travel mode signals md1 to md5 from the select switch 400.

The SIO 134 receives a steering angle signal $\theta_D$ of the drive wheel 104 from the steering control section 116B, and sends target steering angle signals $\theta_L$ and $\theta_R$ for the left and right load wheels and left and right steering end signals $\theta_{DL}$ and $\theta_{DR}$, to the steering control section 116B. The target steering angle signals $\theta_L$ and $\theta_R$ are calculated by the master CPU 133 on the basis of the steering angle signal $\theta_D$, the travel mode signals md1 to md5 from the select switch 400, the brake detection signal $B_K$, and the travel angle signal $\theta_O$.

The steering control section 116B includes an A/D converter 136, a ROM2 137, a RAM2 138, a slave CPU 139, an SIO 140, D/A converters 141 to 143, and logic circuits 144 to 146.

The A/D converter 136 receives a steering angle signal $\theta_D$ of the drive wheel from the potentiometer 118, actual steering angle signals $\theta_R'$ and $\theta_L'$ of the left and right load wheels respectively from the potentiometers 114 and 113, and a steering torque signal T from the steering torque detection device 309.

The SIO 140 sends the steering angle signal $\theta_D$ to the master control section 116A, and receives the target steering angle signals $\theta_L$ and $\theta_R$ for the left and right load wheels which are calculated by the master CPU 133 on the basis of the steering angle signal $\theta_D$, and also receives the left and right steering end signals $\theta_{DL}$ and $\theta_{DR}$.

Based on the signals sent from the master control section 116A, the slave CPU 139 performs a well-known feedback control to control the power steering motor 312 and the steering motors 112 and 111 for the left and right load wheels so as to achieve the target values.

The slave CPU 139 sends control signals through its I/O to the logic circuits 144, 145 and 146 which respectively control the steering motors so that they are, for example, rotated in a normal or reverse direction, or forced to be locked.

The process of the master CPU 133 will be described by illustrating each STEP with reference to the flowchart of FIG. 15. First, the RAM1 132 and hardware components such as the I/O devices are initialized (STEPs 1 and 2), and a travel mode signal is input (STEP 3).

Next, the master CPU 133 receives a steering angle signal $\theta_D$ of the drive wheel from the steering control section 116B (STEP 4). In accordance with the travel mode signal, branching is effected so that the process proceeds to one of the branch procedures (STEP 5). A program corresponding to the selected travel mode is read out from the above-mentioned ROM1 131, and target steering angles $\theta_L$ and $\theta_R$ for the left and right load wheels and the like based on the travel mode signal md1, md2, md3, md4 or md5 are calculated (STEPs 6 to 19), and then sent to the steering control section 116B (STEP 20). The procedures for travel modes 1 to 5 will be described below in that order.

The process for travel mode 1 is effected when the travel mode signal md1 is selected through the select switch 400 (STEP 7). After branching is performed in STEP 5, first, variable steering end signals $\theta_{DL}$ and $\theta_{dR}$ are sent to the steering control section 116B (STEP 6). The reason of this is as follows: According to the invention, a desired travel mode can be selected from a plurality of travel modes, and therefore the positions of the steering ends which define the range of the steering angle of the drive wheel are required to be changed depending on the selected travel mode. This process will be specifically described later in the description of the operation of the slave CPU 139.

Figure 16:
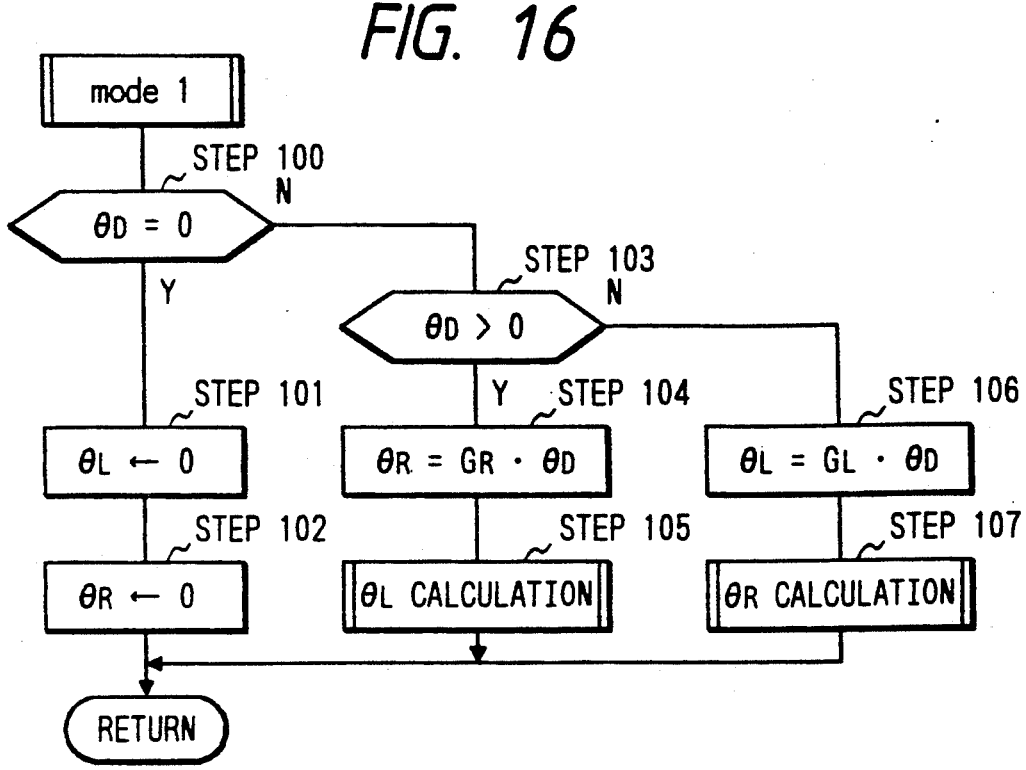
FIG. 16 is a flowchart showing the process procedure of travel mode 1.

The calculation procedure for travel mode 1 is programmed in the form of a subroutine. In this travel mode, the forklift can make extremely small turns. The procedure is shown in FIG. 16.

Figure 21:
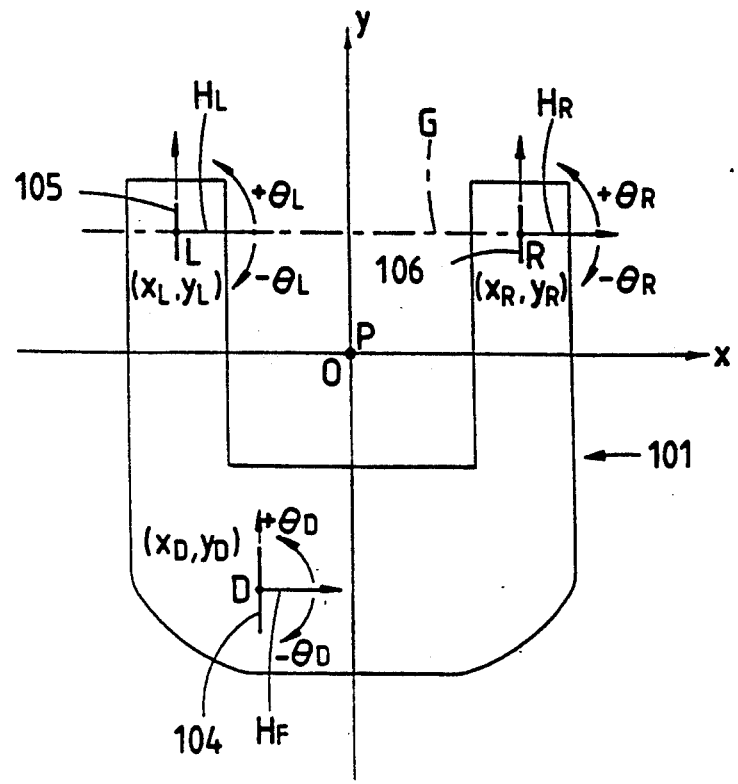
FIG. 21 is a diagram illustrating steering angles.

As shown in FIG. 21, the steering angles $\theta_L$ and $\theta_R$ of the left and right load wheels 105 and 106 are angles formed by an axis G and an extension line $H_L$, and by the axis G and an extension line $H_R$, respectively. The axis G passes both the steering centers L and R of the left and right load wheels 105 and 106. The extension lines $H_L$ and $H_R$ are virtual lines respectively elongating from the rotation axes of the left and right load wheels (hereinafter, these lines are referred to as "extension lines $H_L$ and $H_R$").

Similarly, the steering angle $\theta_D$ of the drive wheel is an angle formed by an extension line $H_F$ of the rotation axis of the drive wheel 104 (hereinafter, referred to as "extension line $H_F$") and an axis which is perpendicular to the center line of the forklift in a plan view. It is supposed that these steering angles are positive in the counterclockwise direction. Hence, when the steering angle $\theta_D$ of the drive wheel is positive, the forklift 101 turns toward the right. When it is negative, the forklift 101 turns toward the left.

The master CPU 133 checks the steering angle $\theta_D$ of the drive wheel to judge whether it is zero or not, or whether the forklift travels straight or makes a turn (STEP 100). When the steering angle $\theta_D$ is zero (Yes in STEP 100), the target steering angles $\theta_L$ and $\theta_R$ for the left and right load wheels are both set to zero (STEPs 101 and 102). Then, the process returns to the main routine.

Accordingly, the steering control section 116B carries out a feedback control so that the steering angles $\theta_L$ and $\theta_R$ of the left and right load wheels are zero, i.e., coincide with their target value.

When the steering angle $\theta_D$ of the drive wheel is not zero, i.e., when the forklift is required to make a turn, the required direction is detected (STEP 103). When the steering angle of the drive wheel is positive (Yes in STEP 103), the target steering angle $\theta_R$ for the right load wheel is determined by multiplying the steering angle $\theta_D$ of the drive wheel by a predetermined steering angle gain $G_R$.

In contrast, when the forklift 101 is required to turn toward the left, i.e., when the steering angle $\theta_D$ of the drive wheel is negative (No in STEP 103), the target steering angle $\theta_L$ for the left load wheel is determined by multiplying the steering angle $\theta_D$ of the drive wheel by a predetermined steering angle gain $G_L$ (STEP 106).

Therefore, the steering angle $\theta_D$ of the drive wheel 104 is always kept proportional to the target steering angle $\theta_L$ or $\theta_R$ for the left or right load wheel. In this specification, the constant of this proportion is referred to as a steering angle gain.

The steering angle gain can be determined depending on the size and use of a forklift, the environment where it is used, etc. In this embodiment, a few preferred examples of the steering angle gain will be described below.

Figure 24:
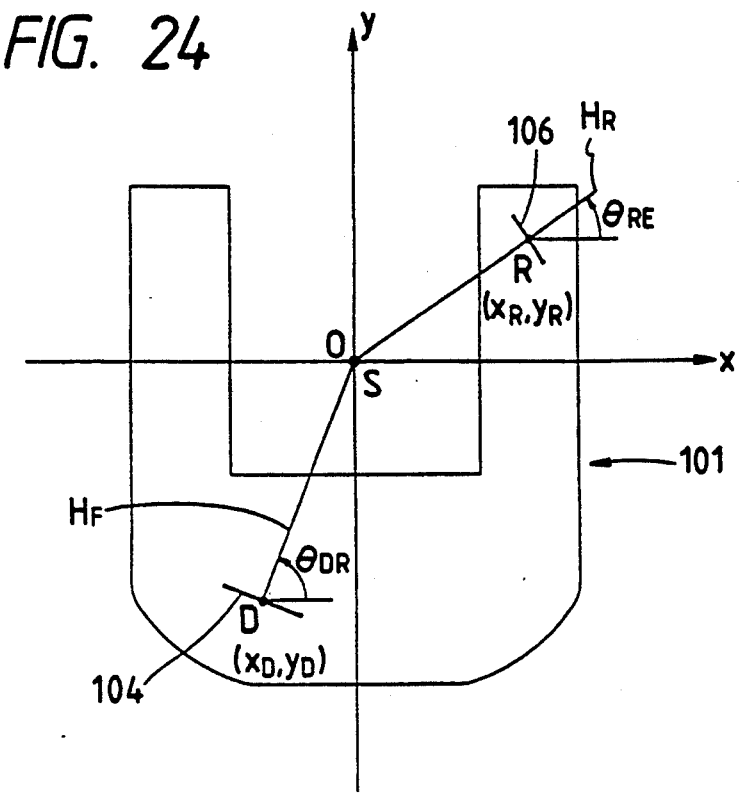
FIG. 24 is a diagram illustrating a steering angle gain.

Initially, a first example of the steering angle gain will be described with reference to FIGS. 24 and 25. A minimum turning center S about which the forklift 101 carrying a load thereon can turn with its minimum turning radius is previously set. In the case where the forklift 101 turns toward the right, as shown in FIG. 24, a steering angle $\theta_{DR}$ of the drive wheel is so determined that the extension line $H_F$ of the drive wheel passes the minimum turning center S, and a steering angle $\theta_{RE}$ of the right load wheel is so determined that the extension line $H_R$ of the right load wheel passes the minimum turning center S. The steering angle gain is determined on the basis of the ratio of the steering angle $\theta_{RE}$ to the steering angle $\theta_{DR}$.

Figure 25:
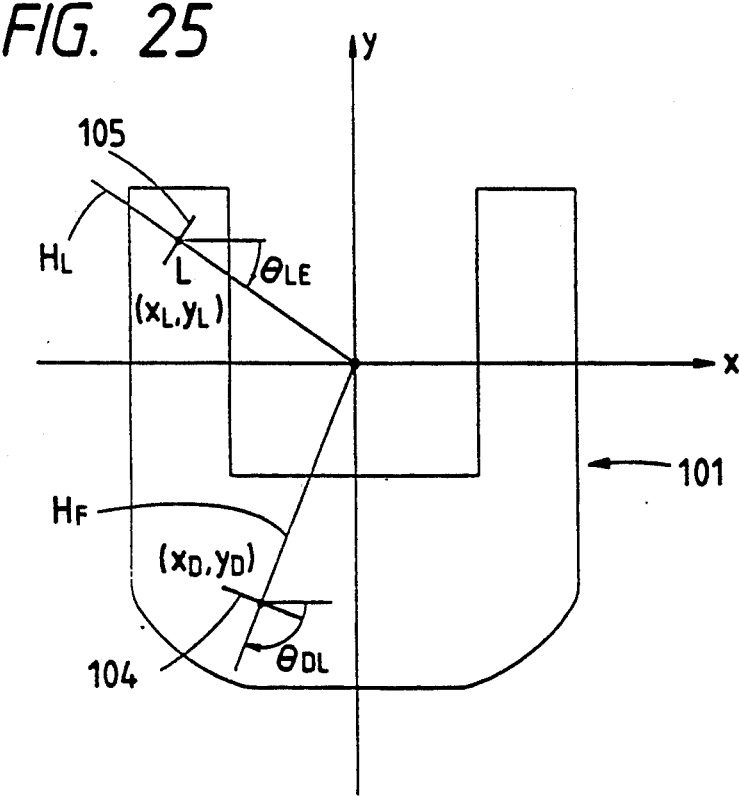
FIG. 25 is a diagram illustrating a steering angle gain.

In the case where the forklift 101 turns toward the left, as shown in FIG. 25, a steering angle $\theta_{DL}$ of the drive wheel is so determined that the extension line $H_F$ of the drive wheel passes the minimum turning center S, and a steering angle $\theta_{LE}$ of the left load wheel is so determined that the extension line $H_L$ of the left load wheel passes the minimum turning center S. Based on the ratio of the steering angle $\theta_{LE}$ to the steering angle $\theta_{DL}$, the steering angle gain is determined.

It is herein assumed that the minimum turning center S is designated as the origin of an x-y rectangular coordinate system, that the steering centers L and R of the left and right load wheels 105 and 106 are represented by $(x_L, y_L)$ and $(x_R, y_R)$, respectively, and that the steering center D of the drive wheel is represented by $(x_D, y_D)$. Then, the steering angle gain $G_R$ for the right load wheel can be obtained by Ex. 1 below, and the steering angle gain $G_L$ for the left load wheel can be obtained by Ex. 2 below.

$$G_R = \frac{\tan^{-1}(y_R/x_R)}{\tan^{-1}(y_D/x_D)} \quad \text{[Ex. 1]}$$

$$G_L = \frac{\tan^{-1}(y_L/x_L)}{\tan^{-1}(y_D/x_D) - \pi} \quad \text{[Ex. 2]}$$

These steering angle gains $G_R$ and $G_L$ are previously stored in the ROM1 131.

In the case where the steering angle $\theta_D$ of the drive wheel is positive (Yes in STEP 103), a turning center P $(x_P, y_P)$ of the forklift is calculated on the basis of the geometric relationship between the steering angle $\theta_D$ of the drive wheel and the target steering angle $\theta_R$ for the right load wheel which has been obtained by multiplying the steering angle $\theta_D$ by the steering angle gain $G_R$.

A target steering angle $\theta_L$ for the left load wheel is determined through calculation so that the extension line $H_L$ of the left load wheel can pass the thus calculated turning center P (STEP 105).

Figure 26:
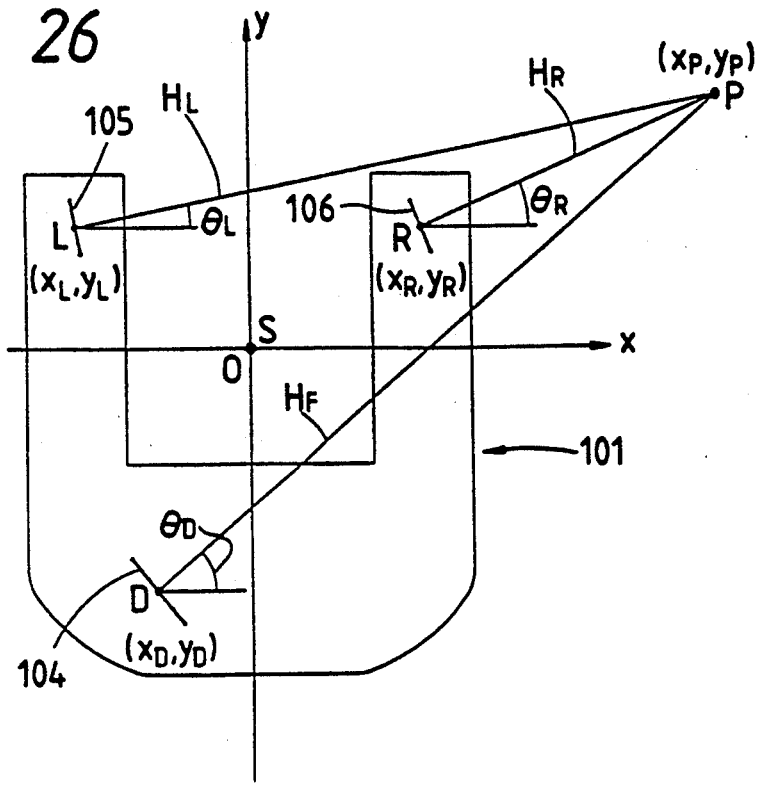
FIG. 26 is a diagram illustrating the calculation in travel mode 1.

As shown in FIG. 26, the turning center P of the forklift can be given by obtaining the intersection of the extension line $H_F$ of the drive wheel and the extension line $H_R$ of the right load wheel. The extension line $H_F$ of the drive wheel and the extension line $H_R$ of the right load wheel can be expressed by the linear equations of Exs. 3 and 4, respectively.

$$y = \tan\theta_D x + y_D - x_D \tan\theta_D \quad \text{[Ex. 3]}$$

$$y = \tan\theta_R x + y_R - x_R \tan\theta_R \quad \text{[Ex. 4]}$$

When Exs. 3 and 4 above are solved simultaneously, the coordinates of the turning center P $(x_P, Y_P)$ can be obtained. The coordinates can be expressed by Exs. 5 and 6.

$$x_P = \frac{y_R - y_D - x_R \tan\theta_R + x_D \tan\theta_O}{\tan\theta_D - \tan\theta_R} \quad \text{[Ex. 5]}$$

$$y_P = x_P \tan\theta_D + y_D - x_D \tan\theta_D \quad \text{[Ex. 6]}$$

Next, the target steering angle $\theta_L$ for the left load wheel is so determined that the extension line $H_L$ of the left load wheel can pass the turning center P. The target steering angle $\theta_L$ for the left load wheel can be obtained by Ex. 7 (STEP 106).

$$\theta_L = \tan^{-1} \frac{y_P - y_L}{x_P - x_L} \quad \text{[Ex. 7]}$$

By controlling the left and right load wheels 105 and 106 in the above-described manner, the forklift 101 is kept to perform an extremely smooth turning operation while fully satisfying the theory of Ackerman-Jeantaud.

In the same manner as described above, when the steering angle $\theta_D$ of the drive wheel 104 is negative (No in STP 103), the turning center P $(x_P, y_P)$ of the forklift is calculated on the basis of the geometric relationship between the steering angle $\theta_D$ of the drive wheel and the target steering angle $\theta_L$ for the left load wheel which has been obtained by multiplying the steering angle $\theta_D$ by the steering angle gain $G_L$.

Figure 27:
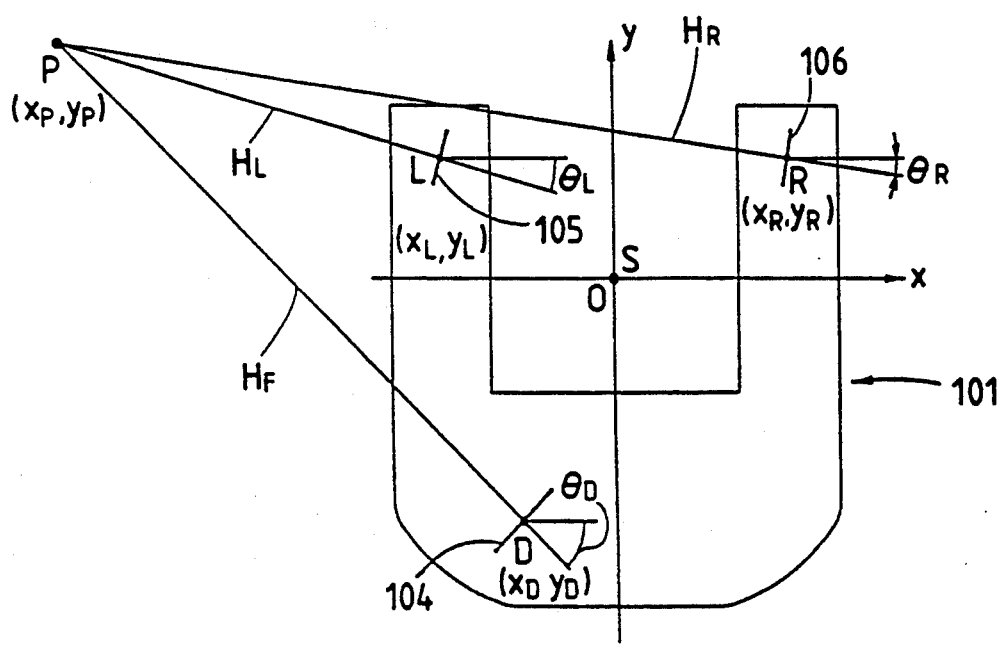
FIG. 27 is a diagram illustrating the calculation in travel mode 1.

Also in this case, as shown in FIG. 27, the extension line $H_F$ of the drive wheel is expressed by the linear equation of Ex. 3 above, and the extension line $H_L$ of the left load wheel is expressed by the linear equation of Ex. 8. These linear equations are solved simultaneously, so that the coordinates of the turning center P are obtained. These coordinates can be expressed by Exs. 9 and 10.

$$y = \tan\theta_L \cdot x + y_L - x_L \cdot \tan\theta_L \quad \text{[Ex. 8]}$$

$$x_P = \frac{y_L - y_D - x_L \cdot \tan\theta_L + x_D \cdot \tan\theta_D}{\tan\theta_D - \tan\theta_L} \quad \text{[Ex. 9]}$$

$$y_P = x_P \cdot \tan\theta_D + y_D - x_D \cdot \tan\theta_D \quad \text{[Ex. 10]}$$

Next, the target steering angle $\theta_R$ for the right load wheel 106 is so determined that the extension line $H_R$ of the right load wheel can pass the turning center P. The target steering angle $\theta_R$ for the right load wheel 106 can be obtained by Ex. 11 (STEP 107).

$$\theta_R = \tan^{-1} \frac{y_P - y_R}{x_P - x_R} \quad \text{[Ex. 11]}$$

The basic concept of the invention has been heretofore described. This will now be described on the basis of specific values of the forklift 101 shown in FIG. 28.

Figure 28:
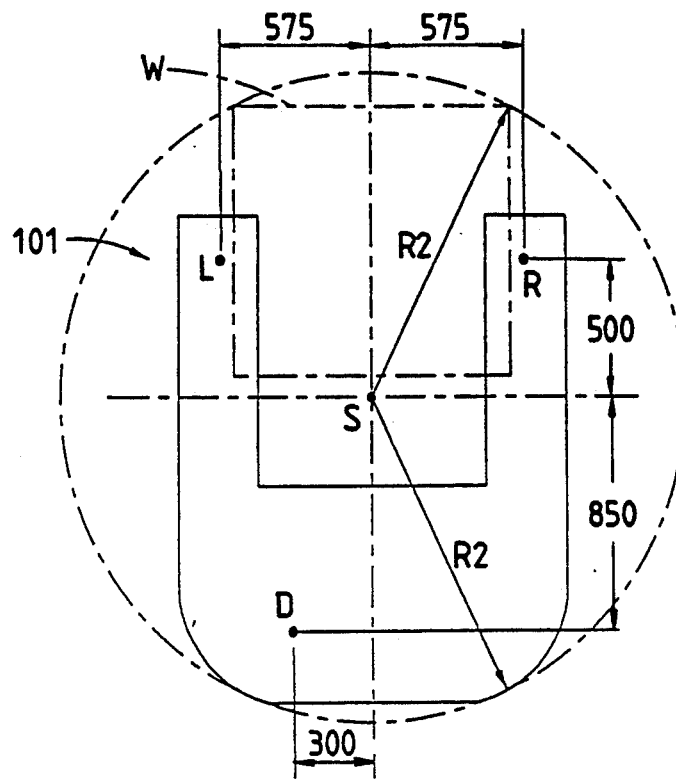
FIG. 28 is a diagram showing specific values of a reach forklift.

First, it is assumed that the forklift 101 is of the size specified by the values shown in FIG. 28, and that the coordinates $(x_L, y_L)$ of the steering center L of the left load wheel 105, the coordinates $(x_R, y_R)$ of the steering center R of the right load wheel 106, and the coordinates $(x_D, y_D)$ of the steering center D of the drive wheel 104 are set as follows:

$(x_L, y_L) = (-575, 500)$ $(x_R, y_R) = (575, 500)$ $(x_D, y_D) = (-300, -850)$ where all the values are in mm.

Figure 29:
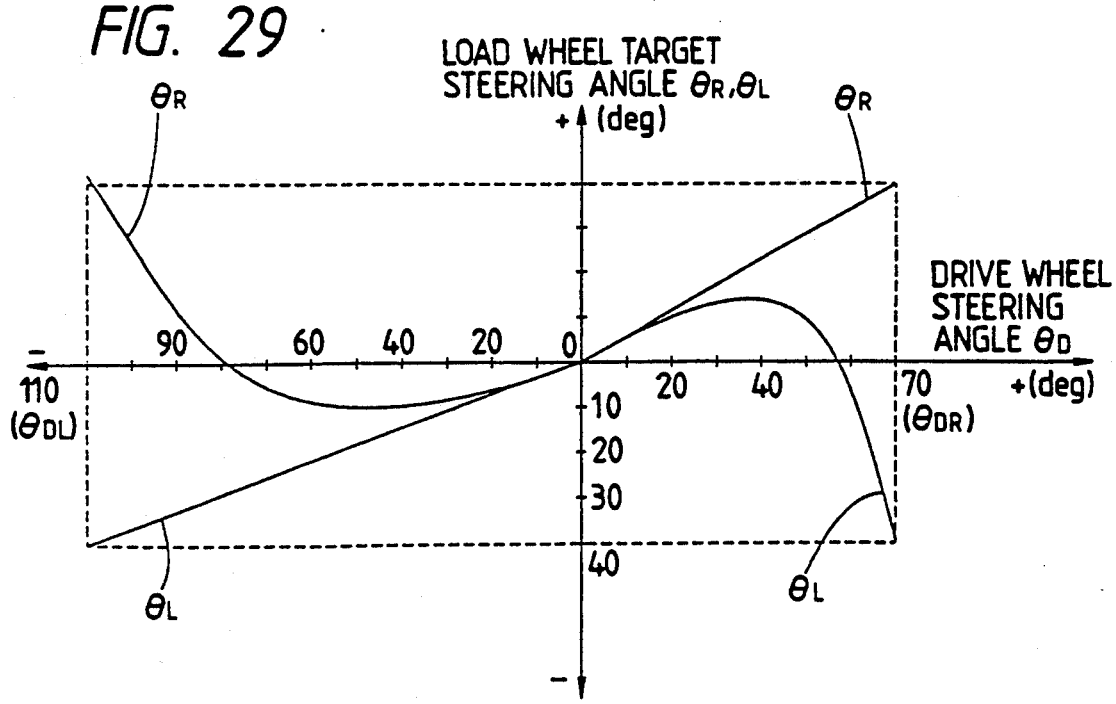
FIG. 29 is an angle diagram of target steering angles of a drive wheel and left and right load wheels.
Figure 30:
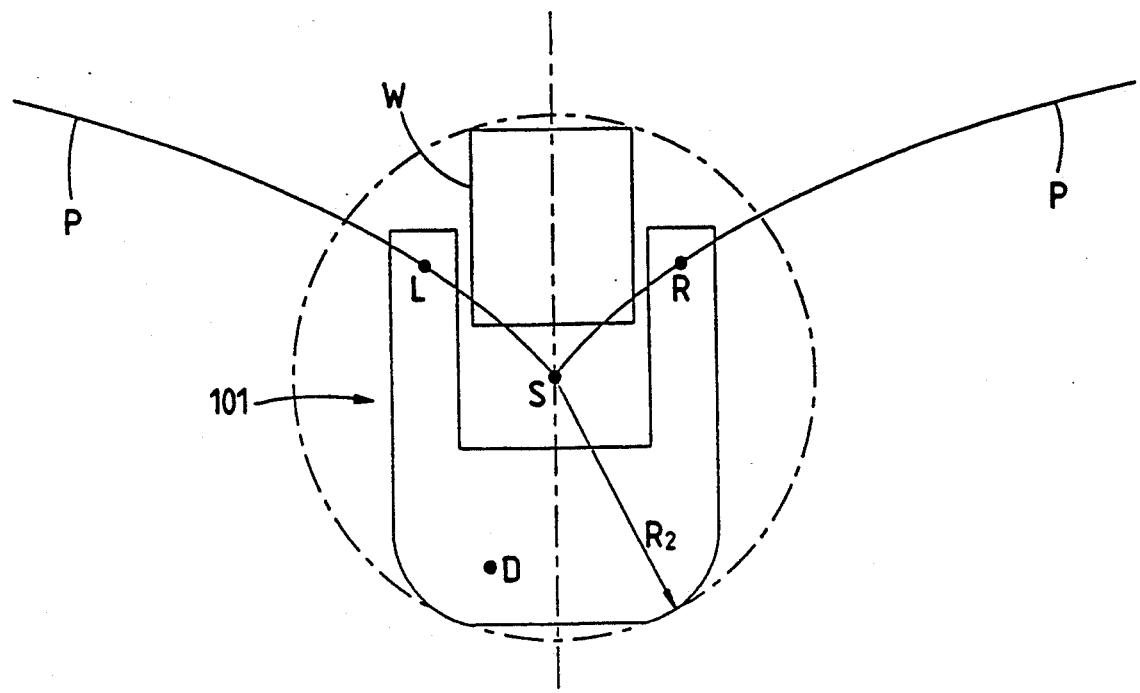
FIG. 30 is a diagram showing the locus of a turning center in travel mode 1.

Using these specific values, the steering angles of the left and right load wheels 105 and 106 with respect to that of the drive wheel 104 are calculated by the above-described procedure. The results are shown in the angle diagram of FIG. 29. The locus of the turning center P of the forklift 101 is shown in FIG. 30. In this example, the steering angle gains $G_R$ and $G_L$ obtained by the above-described procedure are approximately +0.57 and about +0.36, respectively.

As apparent from FIG. 2, when the steering angle $\theta_D$ of the drive wheel 104 is positive (i e, when the forklift 101 turns toward the right), the target steering angle $\theta_R$ for the right load wheel can be linearly changed in proportion to the steering angle $\theta_D$ of the drive wheel 104, thereby achieving an extremely stable and excellent steering control.

In this example, when the steering angle $\theta_D$ of the drive wheel 104 is about −57 degrees, the turning center P coincides with the steering center R of the right load wheel 106. At the steering angle $\theta_D$ of about 57 degrees, the phases of both the left and right load wheels 105 and 106 start to be reversed. As a result, as shown in FIG. 30, the turning center P can be continuously changed eventually to the above-described minimum turning center S, in accordance with the steering angle of the drive wheel 104 provided by operating the steering wheel. This means that the forklift 101 is turned with an extremely small turning radius R2.

Furthermore, when the steering angle $\theta_D$ of the drive wheel 104 is negative (i.e., when the forklift 101 turns toward the left), the same effect as described above can be attained. The phases of both the left and right load wheels 105 and 106 start to be reversed when the steering angle of the drive wheel 104 is about −78 degrees, thereby attaining the same effect as described above.

Figure 31:
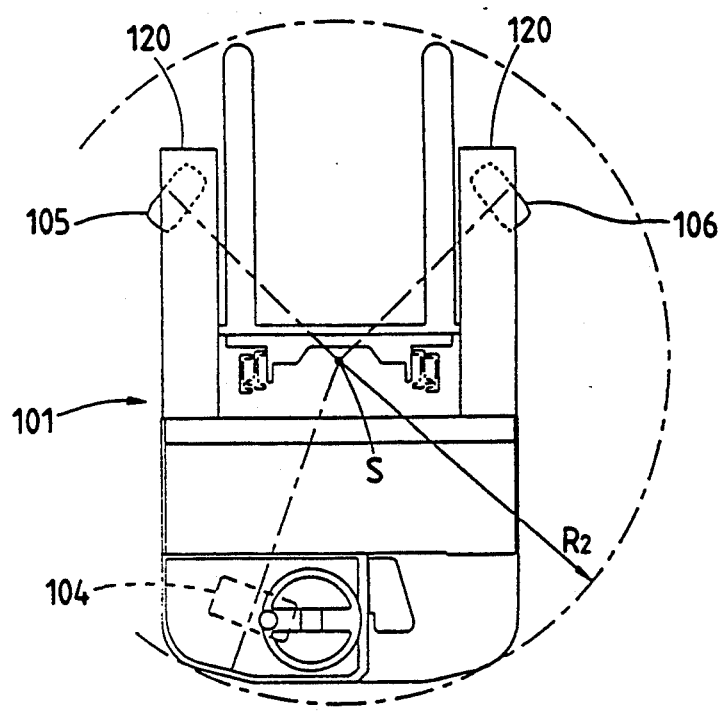
FIG. 31 is a diagram illustrating a turning state of a reach forklift drive.

The ratio of the minimum turning radius R2 of the forklift 101 of the invention to a minimum turning radius R1 of a conventional forklift is approximately 0.7 in the case where the forklifts are of the size shown in this example. The ratio of the area occupied by the forklift 101 of the invention to that occupied by the conventional forklift is approximately 0.5 in the case where the forklifts turn with their bodies kept at their respective positions. In this manner, according to the invention, the minimum turning radius and the occupied area of the forklift can be significantly reduced. FIG. 31 shows the forklift 101 which is turning with its minimum turning radius.

The steering angles $\theta_{DR}$ and $\theta_{DL}$ of the drive wheel 104 respectively shown in FIGS. 24 and 25 are the angles for the left and right steering ends. The drive wheel 104 is so controlled that it cannot be turned beyond the steering ends. This will be described later.

Figure 32:
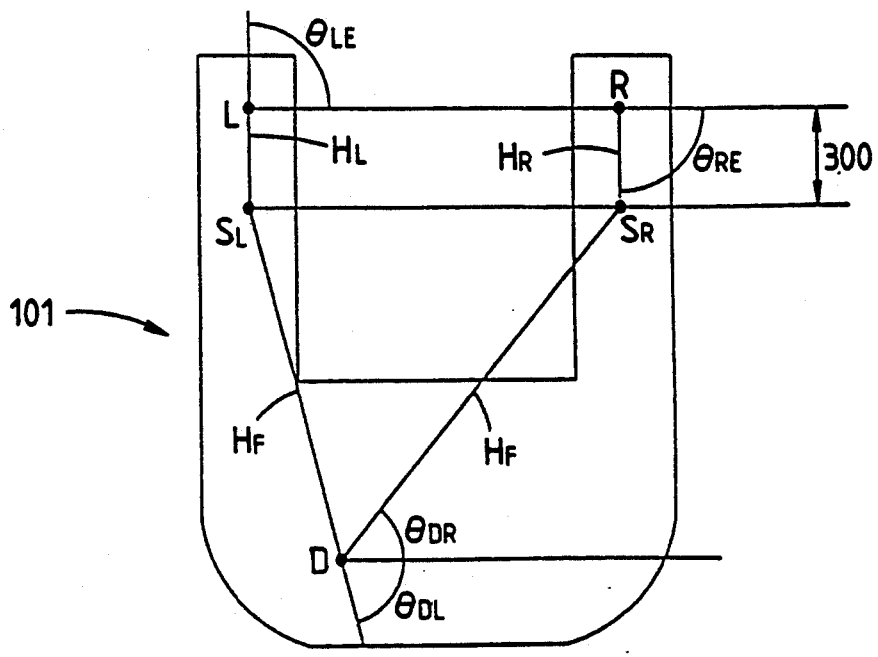
FIG. 32 is a diagram illustrating another example of a steering angle gain.

Next, another example of the steering angle gain will be described. In this example, as shown in FIG. 32, the minimum turning center $S_R$ about which the forklift turns toward the right is displaced from the steering center R of the right load wheel by 300 mm in the vertically downward direction (as viewed in the figure). Using this minimum turning center $S_R$, the steering angle gain $G_R$ is determined.

In the case of leftward turning, the minimum turning center $S_L$ is displaced from the steering center L of the left load wheel by 300 mm in the vertically under direction (as viewed in the figure). Using this minimum turning center $S_L$, the steering angle gain $G_L$ is determined. In this example, the steering angle gains $G_R$ and $G_L$ are approximately $-1.79$ and $-1.19$, respectively, when calculated by Exs. 1 and 2 above using the above specific values.

Figure 33:
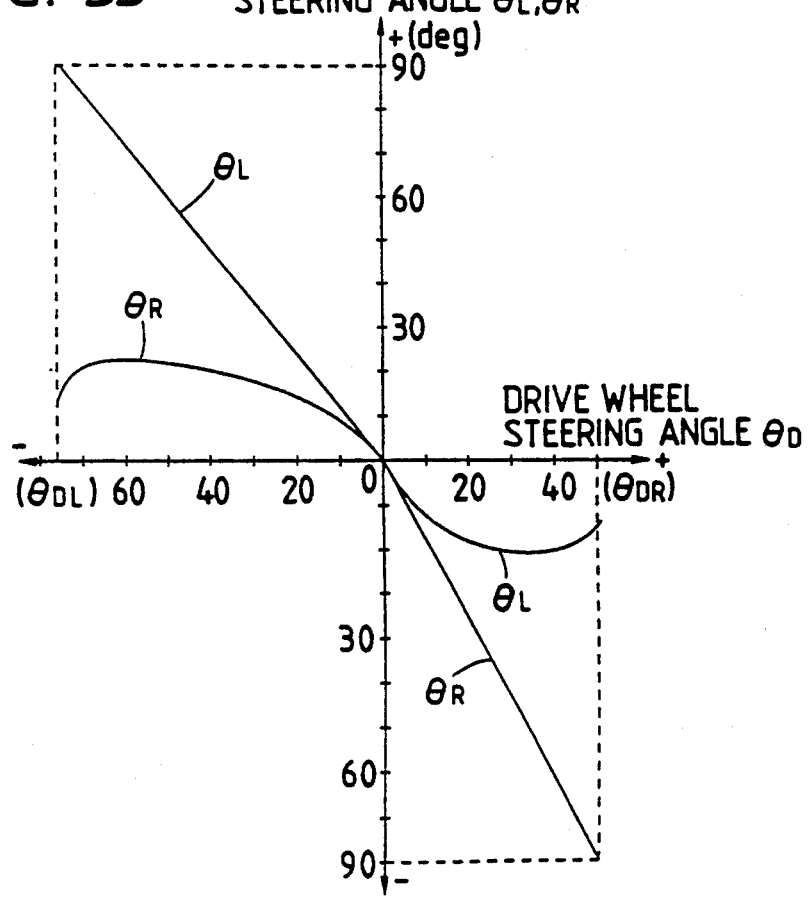
FIG. 33 is an angle diagram of target steering angles of a drive wheel and left and right load wheels.
Figure 34:
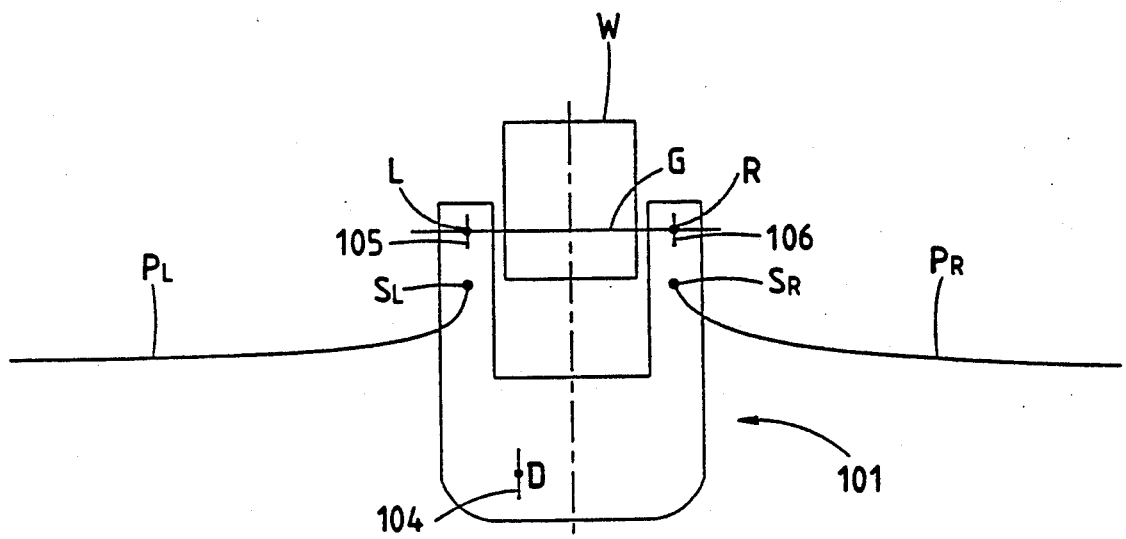
FIG. 34 is a diagram showing the locus of a turning center in travel mode 1.

Using the thus obtained steering angle gains $G_R$ and $G_L$, calculations are performed by the above-described procedure, resulting in the target steering angles $\theta_L$ and $\theta_R$ for the left and right load wheels with respect to the steering angle of the drive wheel 104 shown in the angle diagram of FIG. 33, and also resulting in the locus of the turning center P of the forklift shown in FIG. 34.

When the steering angle gains of this example are used, the turning center follows a locus designated by $P_R$ as the forklift turns to the right, while it follows a locus designated by $P_L$ as the forklift turns to the left. Thus, the turning center can be continuously changed in either direction while being kept below (as viewed in the figure) the axis G passing the steering centers L and R of the left and right load wheels.

Accordingly, the left and right load wheels 105 and 106 are steered with a phase opposite to that of the drive wheel 104, so that the forklift can make a small turn. The left and right load wheels 105 and 106 are controlled with the same phase.

In this example, the angles $\theta_{DL}$ and $\theta_{DR}$ shown in FIG. 32 are the angles for the left and right steering ends, respectively, which define the range of the steering angles of the drive wheel.

The two types of steering angle gains have heretofore been described, but they are presented only as examples. It should be understood that various other types of steering angle gains can also be used.

Next, travel mode 2 will be described with reference to the flowchart of FIG. 17. When a travel mode signal md2 is selected by the select switch 400, the process for travel mode 2 is effected (STEP 9).

This mode is characterized in that, only when the steering angle $\theta_D$ is within a certain range, it is multiplied by the above-mentioned steering angle gain and the steering control of the left and right load wheels 105 and 106 is performed using thus obtained value.

Figure 35:
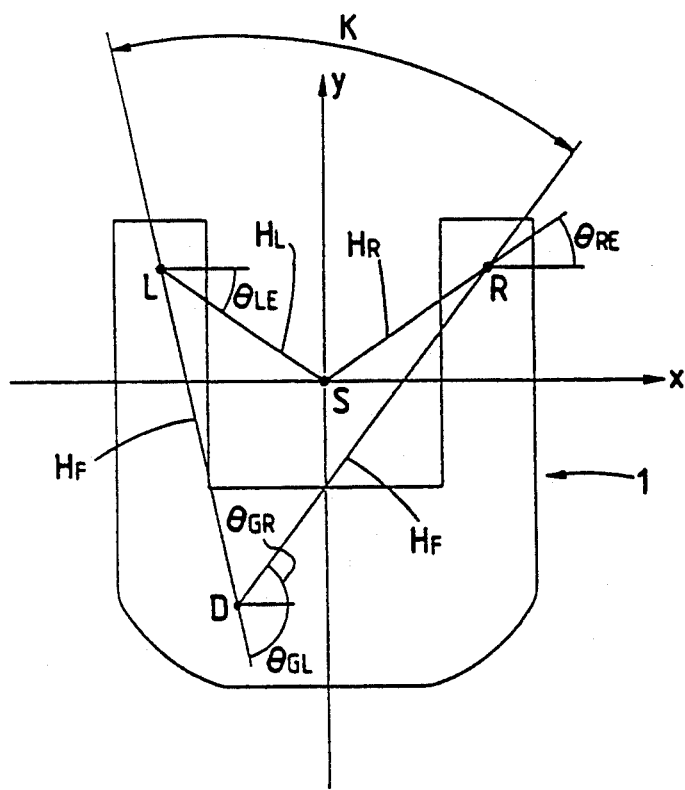
FIG. 35 is a diagram illustrating travel mode 2.

In this example, as shown in FIG. 35, the above mentioned range of angles is set to a range K where the extension line $H_F$ of the drive wheel can exist on or between the steering centers L and R of the left and right load wheels. In the case where the forklift 101 turns toward the right, the steering angle $\theta_D$ of the drive wheel 104 is multiplied by the steering angle gain when it is $\theta_{GR}$ or more. In the case where the forklift 101 turns toward the left, the steering angle $\theta_D$ is multiplied by the steering angle gain when it is $\theta_{GL}$ or less ($\theta_{GL}$ or more in terms of absolute value).

Figure 17:
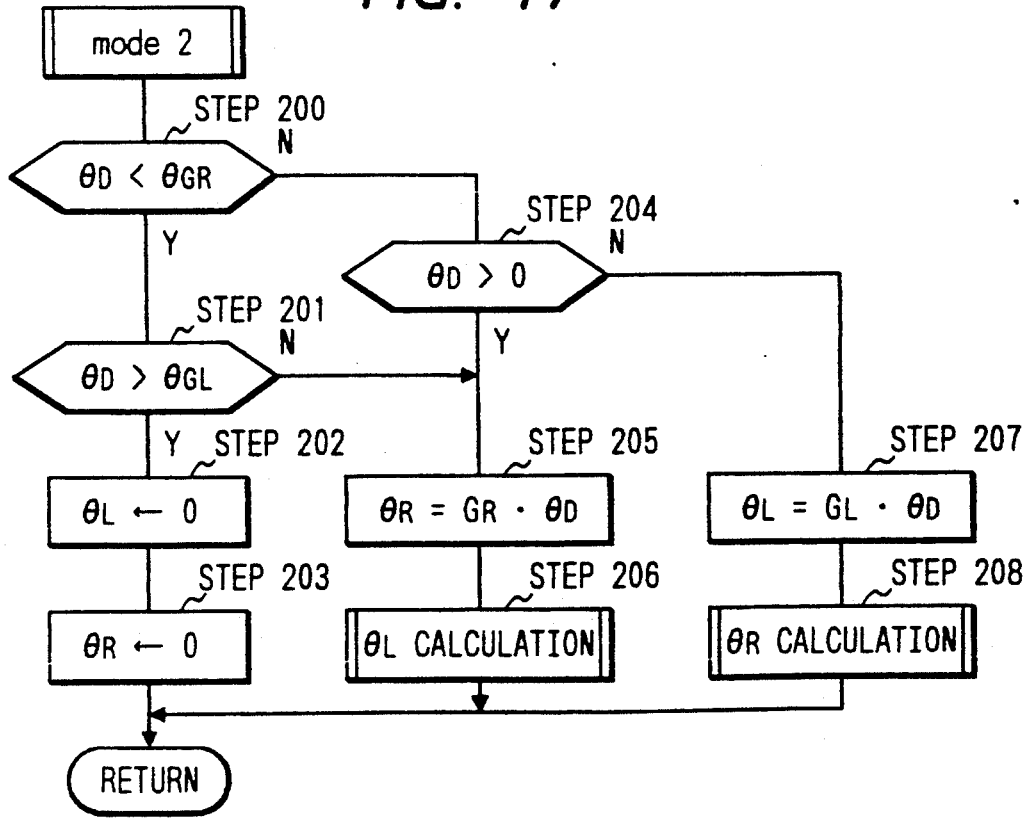
FIG. 17 is a flowchart showing the process procedure of travel mode 2.

The subroutine for travel mode 2 is shown in FIG. 17 which is a flowchart composed of the flowchart for the above-described travel mode 1 (shown in FIG. 16) and additional STEPs 200 and 201.

Therefore, when the forklift is not required to make an extremely small turn, i.e., when the steering angle $\theta_D$ of the drive wheel is relatively small in either the rightward or leftward turning, the target steering angles for the left and right load wheels 105 and 106 are set to zero in the same manner as in travel mode 1. When the steering angle $\theta_D$ of the drive wheel 104 becomes outside an arbitrarily determined range of angles, the left and right load wheels 105 and 106 are so steered that the forklift can make a small turn.

In this case, the steering angle gains are obtained by setting the minimum turning center S to the same point as that of the first example presented for travel mode 1. The target steering angles $\theta_L$ and $\theta_R$ for the left and right load wheels 105 and 106 obtained in this example with respect to the steering angle $\theta_D$ of the drive wheel 104 are shown in the angle diagram of FIG. 36. The locus of the turning center P obtained in this example is shown in FIG. 37.

Figure 36:
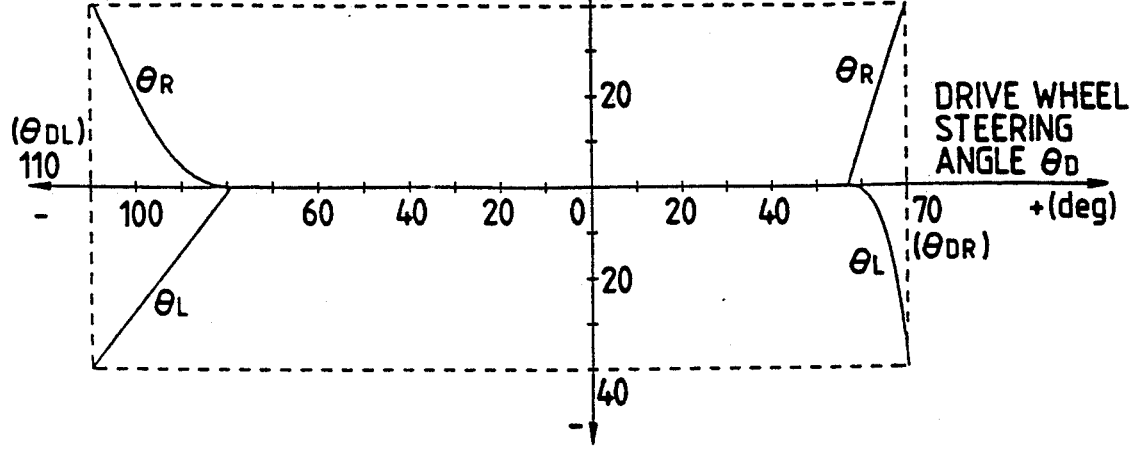
FIG. 36 is an angle diagram of target steering angles of a drive wheel and left and right load wheels.
Figure 37:
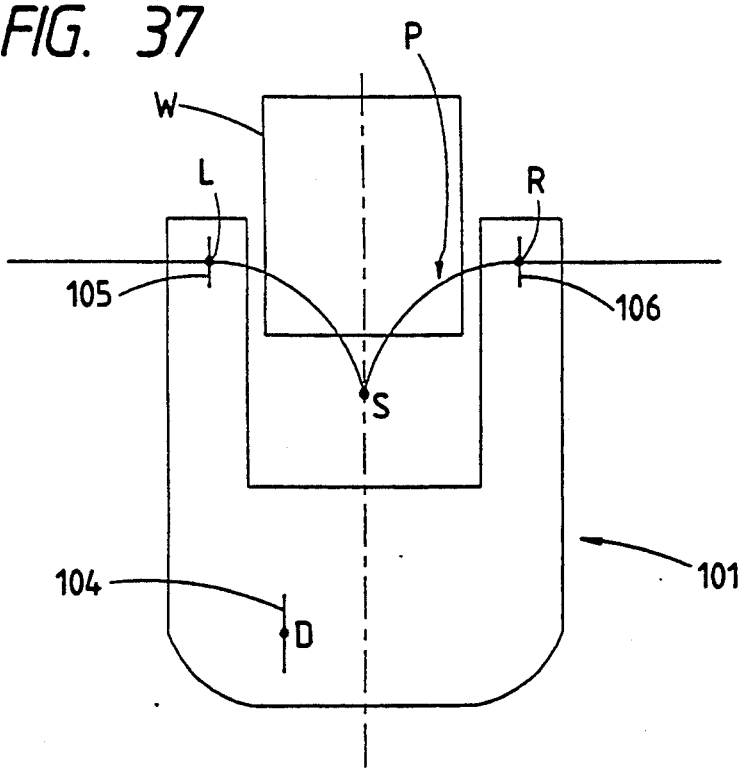
FIG. 37 is a diagram showing the locus of a turning center in travel mode 2.

As seen from FIG. 36, it is apparent that, for example, in the rightward steering of the drive wheel 104, the right load wheel 106 can be linearly controlled, and the left load wheel 105 can also be controlled in an approximately linear manner. This means that the rates of change in the steering angles of the left and right load wheels 105 and 106 are always kept constant. This enables the steering of both the left and right load wheels 105 and 106 to be controlled in an extremely stable manner. In the leftward turning of the drive wheel 104, the same effect can also be attained.

The steering ends of the drive wheel 104 are determined in the same manner as in the first example presented for travel mode 1.

· The invention should not be construed as being limited by the above embodiments. Particularly, according to the invention, it is possible to use a variety of steering angle gains depending on the user's demands and the like. It is needless to say that the range of the steering angles of the drive wheel in which they are to be multiplied by the steering angle gains may be set in various manners within the scope of the invention.

Next, an embodiment for travel mode 3 according to the invention will be described below with reference to the drawings. The process for travel mode 3 is effected when the travel mode signal md3 is selected through the select switch 400 (STEP 10). In this travel mode, the forklift can make a small turn even when the steering angle of the drive wheel is relatively small. The basic concept for this mode is the same as those for travel modes 1 and 2, but a technological concept is introduced into this travel mode, that is, the wheelbase is made shorter in order to allow the forklift to make a small turn even when the steering angle of the drive wheel is in the range of relatively small angles.

Figure 38:
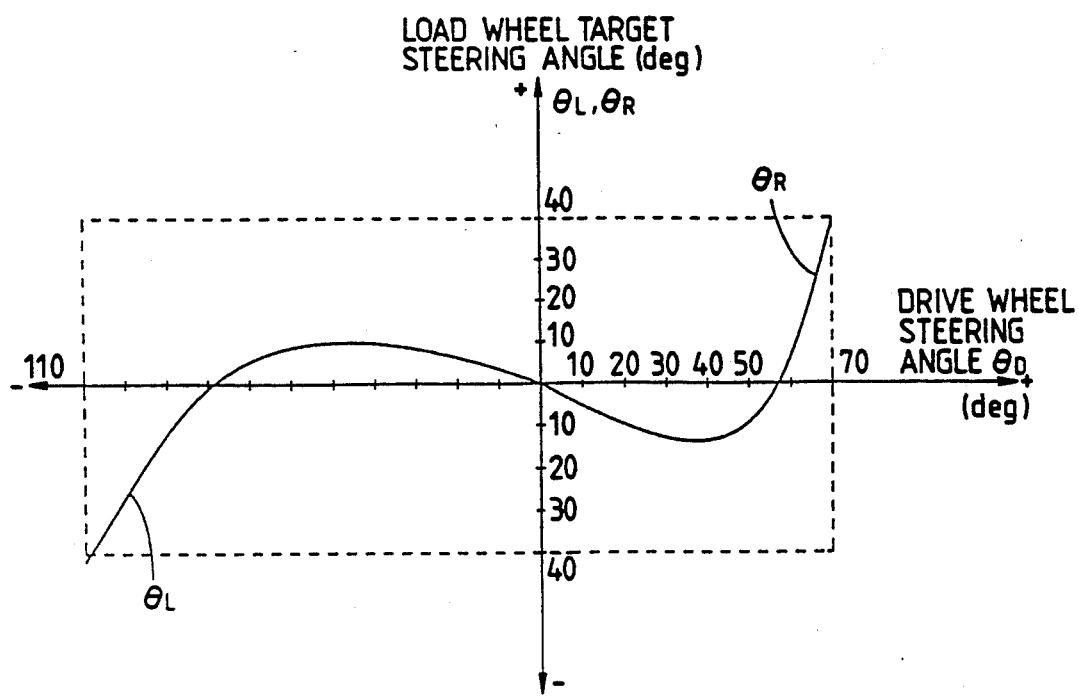
FIG. 38 is an angle diagram of target steering angles of a drive wheel and left and right load wheels.

In the ROM1 131, as shown in FIG. 38, functional data on the target steering angles $\theta_R$ for the right load wheel 106 are stored when the steering angles $\theta_D$ of the drive wheel is positive, and functional data on the target steering angles $\theta_L$ for the left load wheel 105 are stored when the steering angles $\theta_D$ of the drive wheel 104 is negative. These functional relationships are obtained for the above-described forklift 101 shown in FIG. 28.

Figure 39:
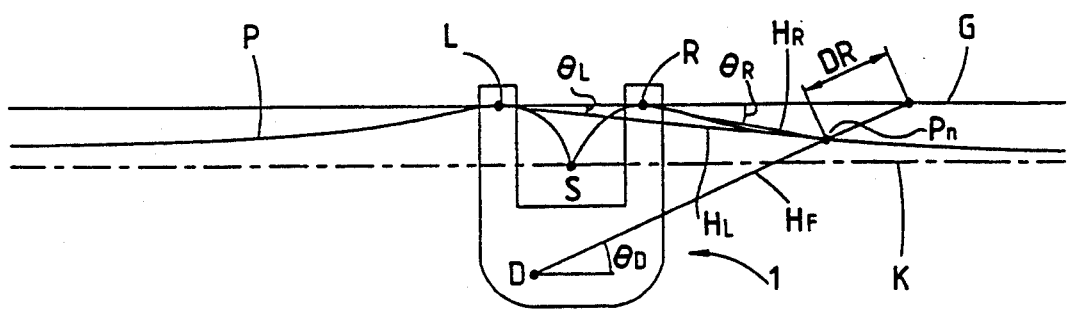
FIG. 39 is a diagram showing the locus of a turning center in travel mode 3.

These functional data can be obtained in the manner described below. FIG. 39 shows the locus of the turning center P of the forklift 101. The locus passes through at least the above-mentioned minimum turning center S and the steering centers L and R of the left and right load wheels. The locus further extends outward from the steering center R of the right load wheel and from the steering center L of the left load wheel, while gradually approaching an arbitrary straight line K elongating along the width direction of the forklift 101 toward the outside thereof. Namely, the locus is an ideal one which is set by smoothly connecting these points.

In this embodiment, the straight line K functions as a reference axis which is used in the case where the steering angle $\theta_D$ of the drive wheel 104 is relatively small, and can be regarded as a reference for a virtual wheelbase. While the straight line K passes the minimum turning center S in this embodiment, this is not intended to limit the scope of the invention.

The target steering angles $\theta_D$ and $\theta_R$ for the left and right load wheels are determined as follows: The steering angle $\theta_D$ of the drive wheel 104 is gradually changed by a minute increment, and at each of the different steering angles $\theta_D$ of the drive wheel, the intersection Pn of the locus P of the turning center and the extension line Hr of the drive wheel 104 is obtained. The target steering angle of the right or left load wheel is obtained as an angle obtained when the extension line $H_R$ or $H_L$ of the right or left load wheel passes the intersection Pn. This is illustrated in the angle diagram of FIG. 38.

Figure 18:
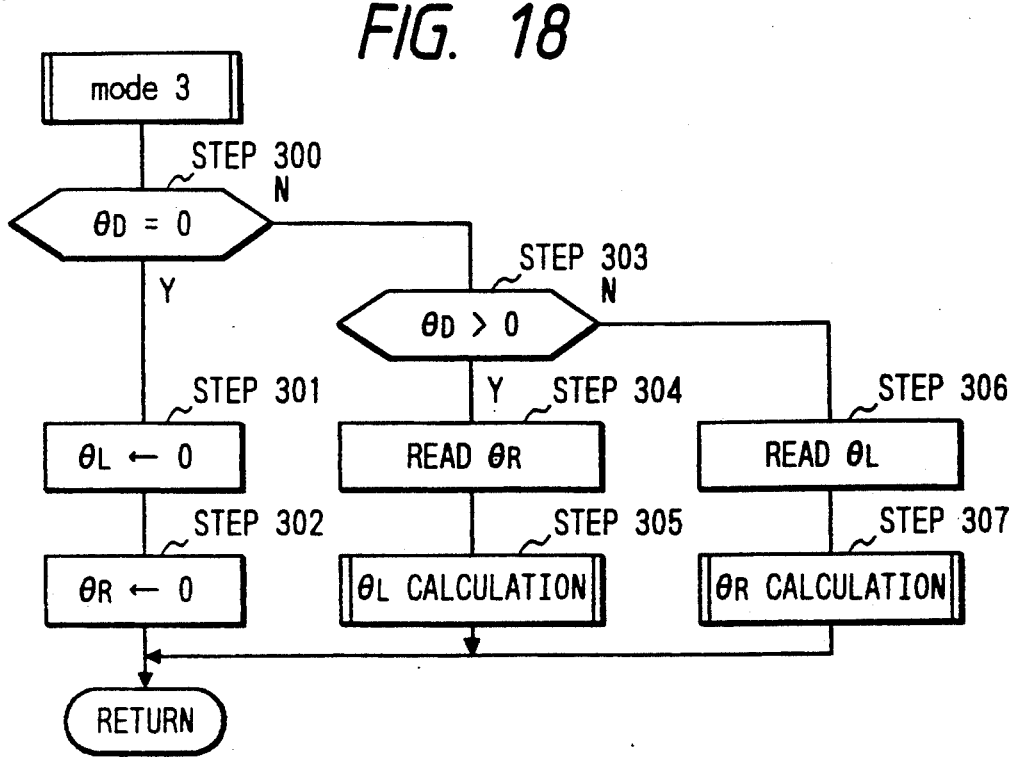
FIG. 18 is a flowchart showing the process procedure of travel mode 3.

Next, the process for travel mode 3 will be described with reference to the flowchart of FIG. 18.

First, the master CPU 133 checks the steering angle $\theta_D$ of the drive wheel to judge whether it is zero or not (STEP 300). When it is zero (Yes in STEP 300), the target steering angles $\theta_L$ and $\theta_R$ for the left and right load wheels are both set to zero (STEPs 301 and 302).

When the steering angle $\theta_D$ of the drive wheel 104 is not zero, or when the forklift makes a turn, the direction of the turning is detected (STEP 303). When the steering angle $\theta_D$ of the drive wheel is positive (Yes in STEP 303), the target steering angle $\theta_R$ for the right load wheel corresponding to this steering angle $\theta_D$ is read out (STEP 304).

Next, the turning center P is obtained through calculation in a geometrical manner from the steering angle $\theta_D$ of the drive wheel and the target steering angle $\theta_R$ for the right load wheel which has been read out from the ROM1 131. The target steering angle $\theta_L$ for the left load wheel 105 is determined through calculation so that the extension line $H_L$ of the left load wheel can pass the calculated turning center P.

The specific procedure of determining the steering angle of the left load wheel so that the extension line thereof passes the turning center P has been described above, and therefore its description is omitted.

When the steering angle $\theta_D$ of the drive wheel is negative (No in STEP 303), the target steering angle $\theta_L$ for the left load wheel corresponding to this steering angle $\theta_D$ is read out (STEP 306). The turning center P is calculated, and then the target steering angle $\theta_R$ for the right load wheel 106 is determined through calculation so that the extension line $H_R$ of the right load wheel can pass the calculated turning center P.

Figure 40:
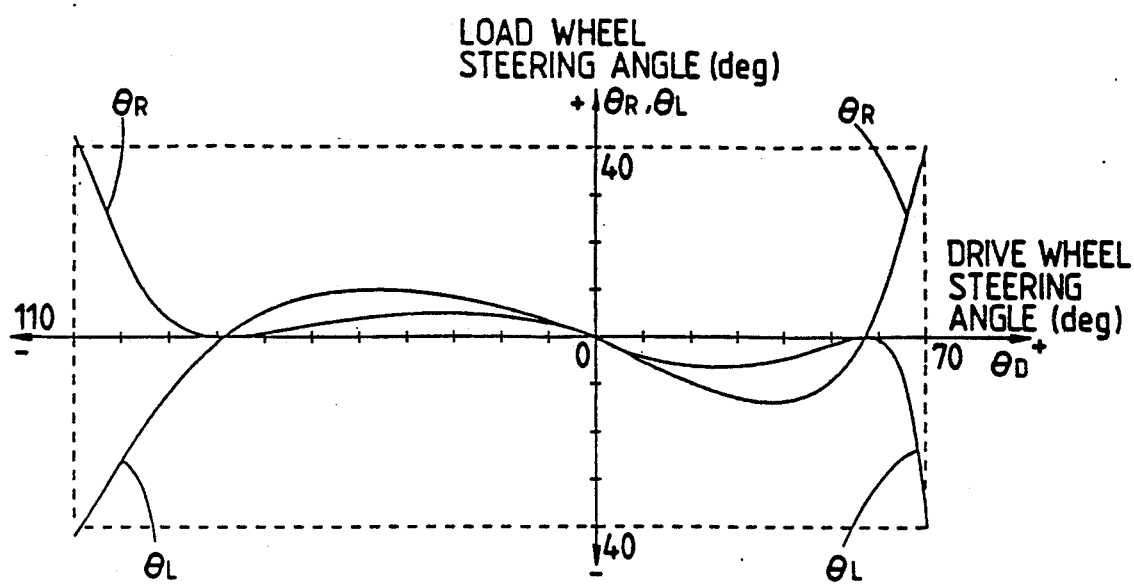
FIG. 40 is an angle diagram of target steering angles of a drive wheel and left and right load wheels.

The target steering angles $\theta_L$ and $\theta_R$ for the left and right load wheels with respect to the steering angle $\theta_D$ of the drive wheel obtained in this embodiment are shown in the angle diagram of FIG. 40. As seen from FIGS. 39 and 40, when the steering angle $\theta_D$ of the drive wheel is relatively small (in this example, approximately +57 degrees or less in the case of rightward steering, and approximately −78 degrees or more in the case of leftward steering), the turning center is continuously changed while being kept below (as viewed in FIG. 39) the axis G passing the steering centers L and R of the left and right load wheels, thereby attaining excellent feeling of turning operation. Furthermore, as compared with the conventional reach forklift, the turning radius is decreased by the length DR, so that the forklift of the invention can make small turns.

When the steering angle $\theta_D$ of the drive wheel becomes relatively large, the locus of the turning center P passes the steering centers L and R of the left and right load wheels and smoothly approaches the minimum turning center S. Accordingly, abrupt changes in the steering operation of the load wheels can be prevented from occurring, and the forklift 101 can be turned with an extremely small turning radius as shown in FIG. 31.

The steering ends of the drive wheel 104 are set in the same manner as in the first example for travel mode 1.

Next, a still further embodiment of the invention will be described. The process for travel mode 4 is effected when the travel mode signal md4 is selected through the select switch 400 (STEP 14). In this travel mode, the travel direction of the forklift can be changed freely without causing the body of the forklift to turn. Furthermore, the attitude of the truck body can be changed with respect to the changed travel direction, thereby attaining an extremely high degree of extendibility.

First, the basic concept of this embodiment will be described with reference to FIGS. 41 to 49. The direction in which the forklift 101 travels is herein referred to as a travel direction. The travel direction S serves as the reference direction for the steering of the forklift 101. The operator usually faces toward the travel direction, and changes the attitude angle of the truck body with respect to the travel direction S by turning the steering wheel to the right or left from the neutral position. Thus, when the travel direction S is taken as the reference direction and the steering angle $\theta_D$ of the drive wheel is zero, the forklift 101 travels straight in the travel direction S.

When the center line of the body of the forklift 101 is designated by C, a travel angle is the angle formed by the center line C and the travel direction S. According to the invention, the travel direction S can be set to any direction by operating the travel angle input device 215. In other words, regardless of the actual orientation of the truck body, the operator can steer the forklift 101 on the assumption that the center line C coincides with the arbitrarily determined travel direction. Therefore, the operator can steer the forklift by using, as the reference direction, the direction of the arrow indicated on the travel angle input device 215.

Figure 41:
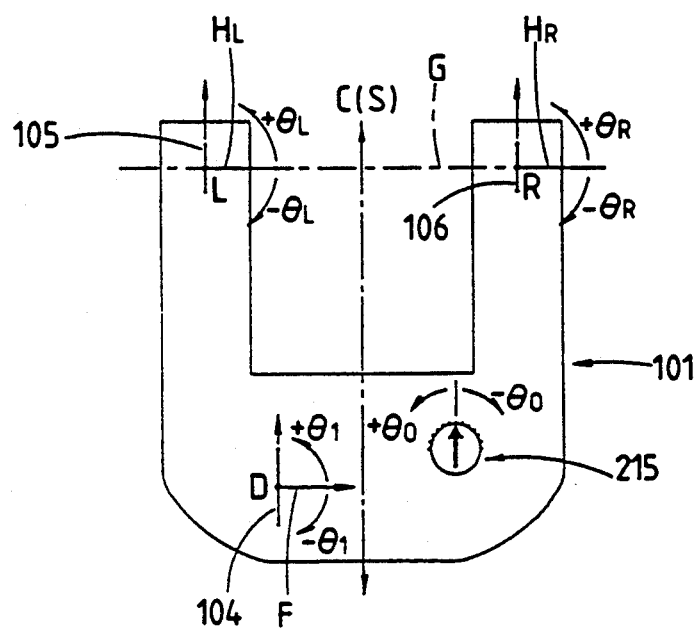
FIG. 41 is a diagram illustrating a travel angle.

FIG. 41 shows the forklift 101 traveling while both the travel angle and steering angle $\theta_D$ of the drive wheel 104 are set to zero. In this case, since the travel direction S coincides with the center line C, the steering angles of the left and right load wheels 105 and 106 are both set to zero. The turning center P of the forklift is geometrically determined by the above-mentioned axis G and the steering angle $\theta_D$ of the drive wheel. The forklift 101 is turning about this turning center (which is a point at infinity on the axis G in this case).

Figure 42:
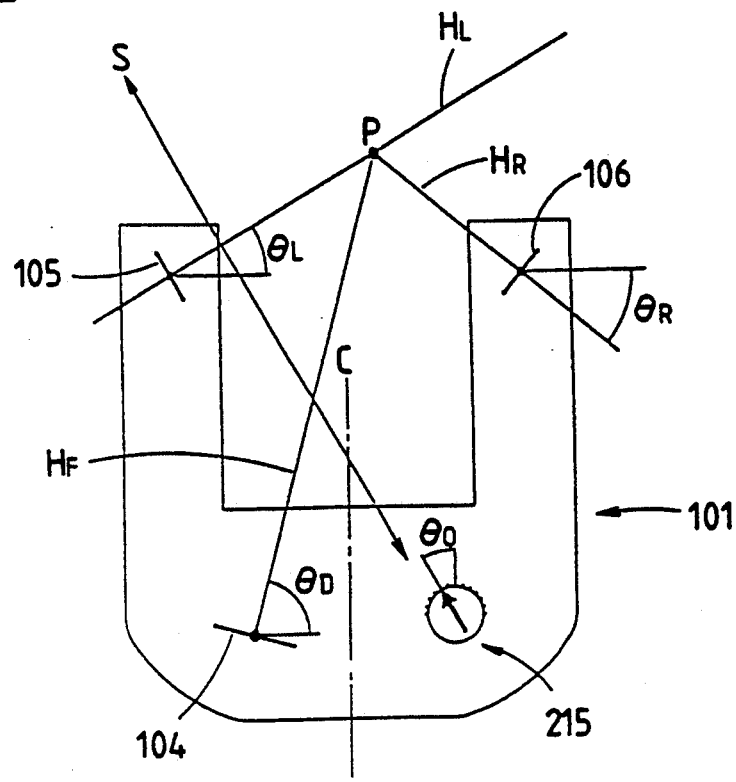
FIG. 42 is a diagram illustrating the basic concept of travel mode 4.

FIG. 42 shows the forklift 101 traveling with the travel angle set to $\theta_O$ in the counterclockwise direction by the travel direction input device 215, and with the steering angle of the drive wheel set to $\theta_D$. In this case, the target steering angle $\theta_L$ for the left load wheel 105 is made equal to the travel angle $\theta_O$. In this state, the intersection of the extension line $H_L$ of the left load wheel 105 and the extension line $H_F$ of the drive wheel 104 is obtained as the turning center P.

Then, the right load wheel 106 is steered so that the extension line $H_R$ thereof can pass the above-mentioned turning center P.

Figure 43:
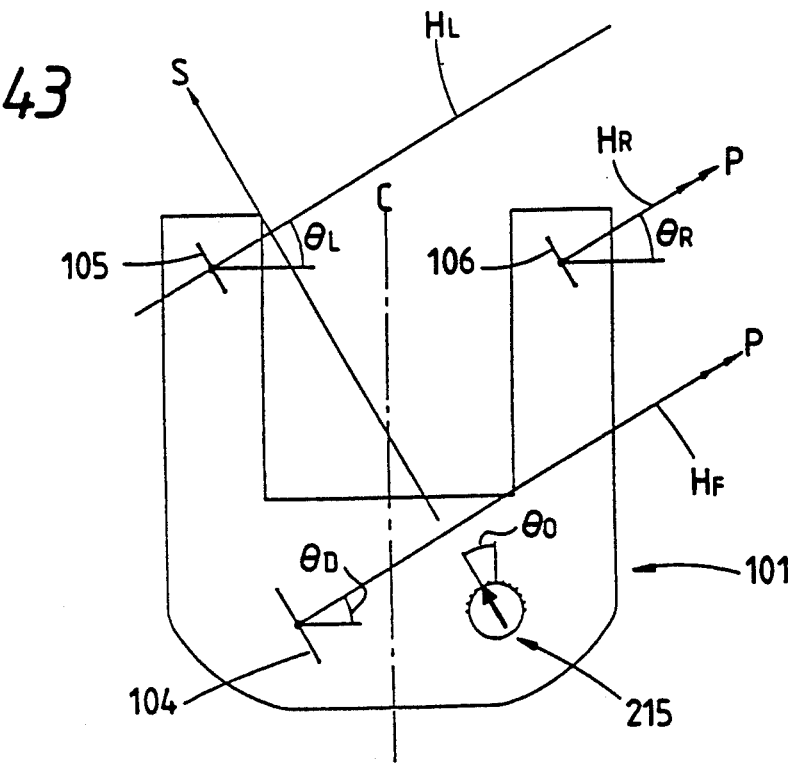
FIG. 43 is a diagram illustrating the basic concept of travel mode 4.

FIG. 43 shows the forklift 101 traveling while the travel angle is set to $\theta_O$ in the counterclockwise direction by the travel direction input device 215, and the drive wheel is steered so that the steering angle $\theta_D$ thereof is made equal to the travel angle $\theta_O$. Thus, as described above, the target steering angle $\theta_L$ for the left load wheel 105 is made equal to the travel angle $\theta_O$, and then the intersection of the extension line $H_L$ of the left load wheel 105 and the extension line $H_F$ of the drive wheel 104 is obtained as the turning center P. In this case, however, the extension lines $H_L$ and $H_F$ are parallel to each other, so that the turning center P is a point at infinity on the extension line $H_L$ (or $H_F$).

Furthermore, the target steering angle $\theta_R$ for the right load wheel 106 is determined through calculation so that the extension line $H_R$ thereof passes the turning center P. However, the extension line $H_R$ also is parallel to both the extension lines $H_L$ and $H_F$, so that the forklift 101 travels diagonally along the travel direction S without causing its body to make a turn. This is because the steering angle $\theta_O$ of the drive wheel 104 becomes zero when the travel direction S is regarded as the reference direction for the steering of the forklift 101.

Figure 44:
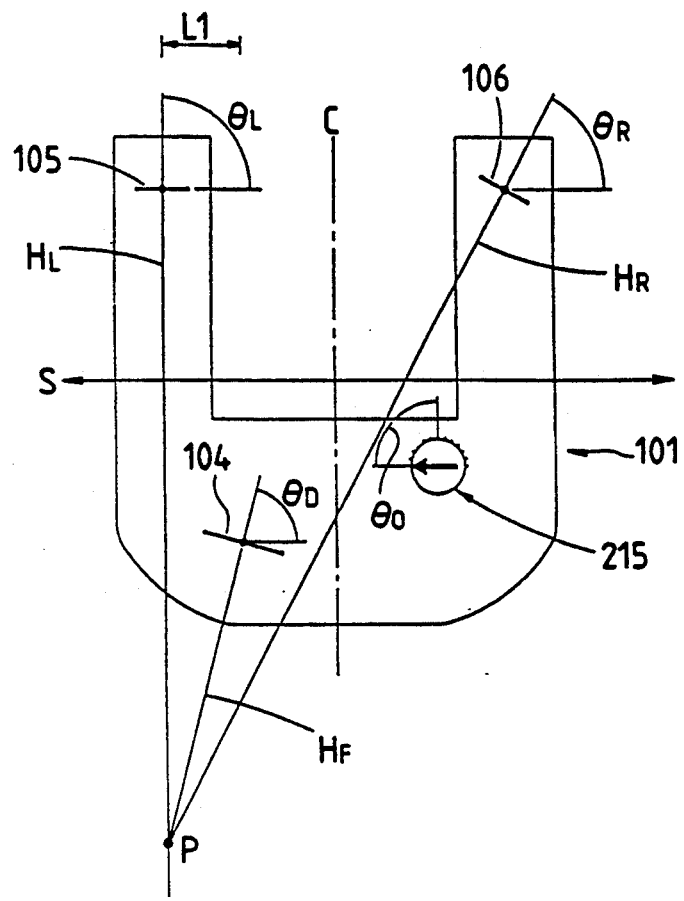
FIG. 44 is a diagram illustrating the basic concept of travel mode 4.

FIG. 44 shows the forklift 101 traveling while the travel angle $\theta_O$ is set to $\pi/2$ in the counterclockwise direction by the travel angle input device 215 and with the steering angle of the drive wheel is set to $\theta_D$. Thus, as described above, the target steering angle $\theta_L$ for the left load wheel 105 is set to $\pi/2$. The intersection of the extension line $H_L$ of the left load wheel 105 and the extension line $H_F$ of the drive wheel 104 is obtained as the turning center P. The steering of the right load wheel 106 is so controlled that the extension line $H_R$ thereof can pass the turning center P. In this state, the actual wheelbase can be significantly decreased to the length L1, so that the forklift 101 can change its attitude in an extremely severe manner.

When the drive wheel 104 is further turned from the position shown in FIG. 44 so that the steering angle $\theta_D$ thereof is increased to $\pi/2$, the forklift 101 travels laterally along the travel direction S without causing the attitude of the body to change, in the same manner as described with reference to FIG. 43. Furthermore, it is possible to correct the attitude of the truck body by steering the drive wheel 104 with respect to the travel direction S.

Figure 45:
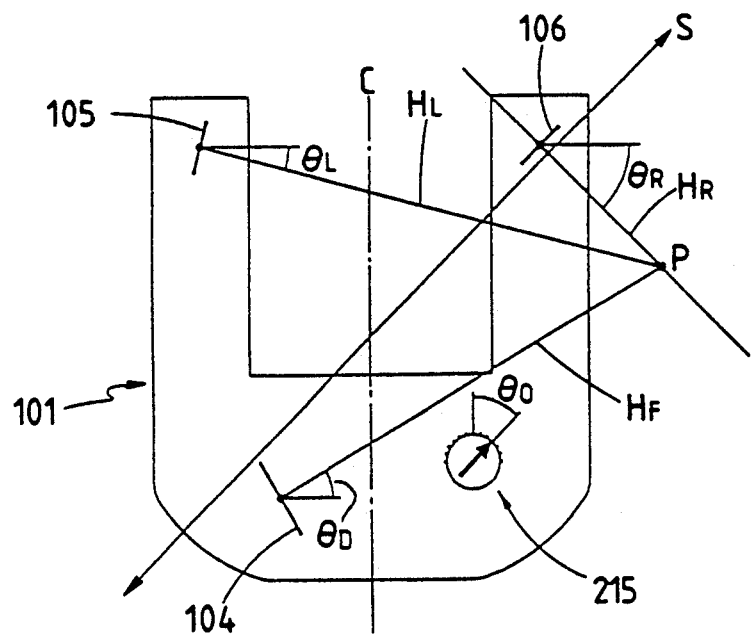
FIG. 45 is a diagram illustrating the basic concept of travel mode 4.

In the forklift illustrated in FIG. 45, the travel angle is set to a negative angle, i.e., $-\theta_O$. In this case, the target steering angle $\theta_R$, for the right load wheel 106 is made equal to the travel angle $-\theta_O$, and the intersection of the extension line $H_R$ of the right load wheel 106 and the extension line $H_F$ is obtained as the turning center P. Then, the left load wheel 105 is steered so that the extension line $H_L$ thereof can pass the turning center P.

Figure 46:
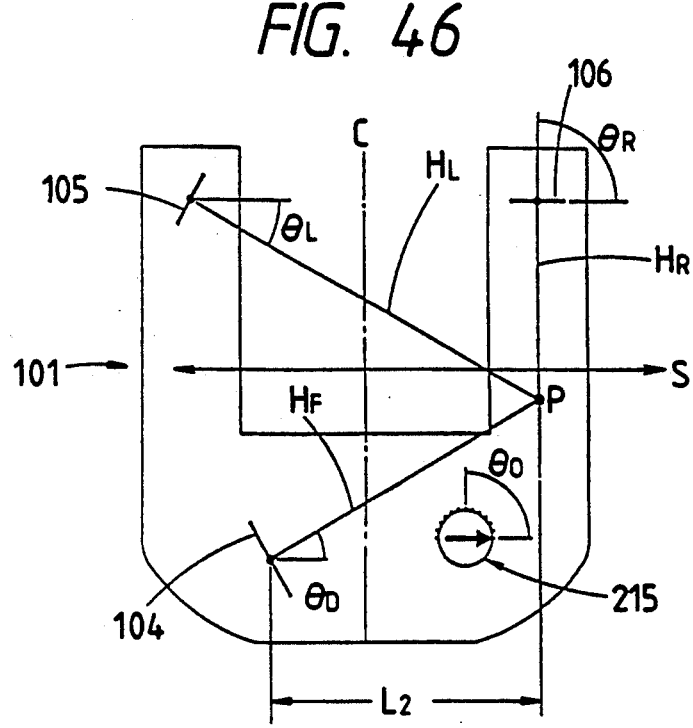
FIG. 46 is a diagram illustrating the basic concept of travel mode 4.

In FIG. 46, the travel angle $\theta_O$ is $-\pi/2$. In this case, the wheelbase is L2. This means that the wheelbase can be made slightly longer than that in the previous case shown in FIG. 42.

Figure 47:
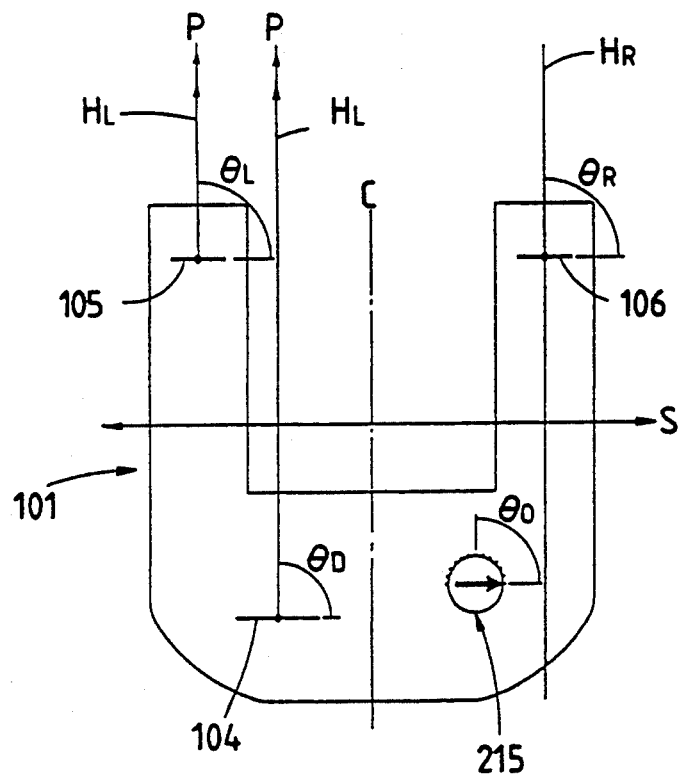
FIG. 47 is a diagram illustrating the basic concept of travel mode 4.

In FIG. 47, both the travel angle $\theta_O$ and the steering angle $\theta_D$ of the drive wheel 104 are $-\pi/2$.

The basic concept of the invention has been heretofore described. It is possible to satisfy the theory of Ackerman-Jeantaud in any travel direction by carrying out the above-described steering control. Furthermore, by providing an arbitrary travel angle, the attitude of the body of the forklift 101 can be corrected on the assumption that the center line C of the truck body is located along the travel direction S determined by the travel angle $\theta_O$, even in the case where, for example as shown in FIG. 42, the center line C is vertical as viewed in the figure.

Accordingly, regardless of the actual orientation of the center line C of the body of the forklift 101, an arbitrary travel direction S is provided so that the attitude of the body of the forklift 101 can be corrected using the travel direction S as the reference direction.

Figure 19:
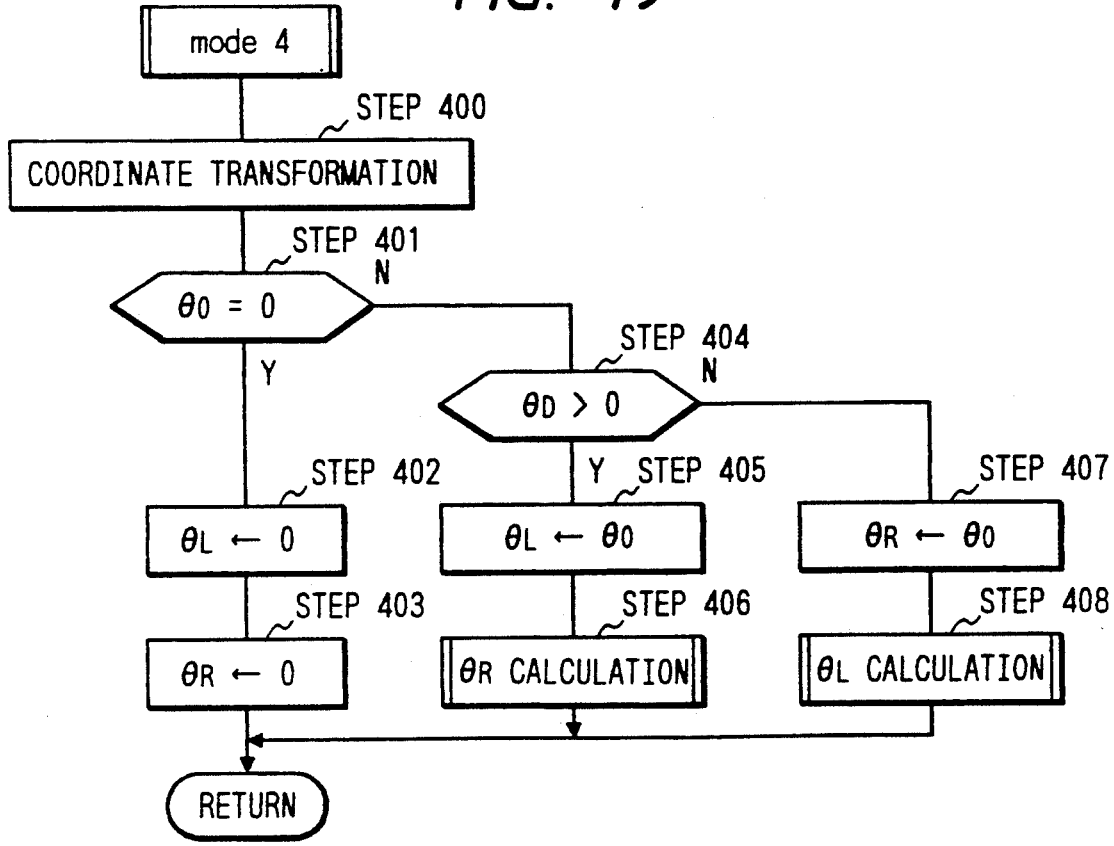
FIG. 19 is a flowchart showing the process procedure of travel mode 4.

A specific procedure which embodies the above concept will be described with reference to the flowchart of FIG. 19.

First, reference coordinate axes (which will be described later) are subjected to a coordinate transformation to be rotated by the travel angle $\theta_O$ (STEP 400). Then, when the travel angle is zero (Yes in STEP 401), both the target steering angles $\theta_L$ and $\theta_R$ for the left and right load wheels are set to zero (STEPs 402 and 403).

In contrast, when the travel angle $\theta_O$ is not zero (No in STEP 401), the master CPU 133 checks the travel angle $\theta_O$ to judge whether it is positive or not (STEP 404). When the travel angle $\theta_O$ is positive (Yes in STEP 404), the target steering angle $\theta_L$ for the left load wheel is made equal to the travel angle $\theta_O$ (STEP 405), and then the target steering angle $\theta_R$ for the right load wheel is calculated (STEP 406).

When the travel angle $\theta_O$ is negative (No in STEP 404), the target steering angle $\theta_R$ for the right load wheel is made equal to the travel angle $\theta_O$ (STEP 407), and then the target steering angle $\theta_L$ for the left load wheel is calculated (STEP 408).

Next, the coordinate transformation in STEP 400 and the calculation procedures in STEPs 406 and 408 will be described in detail with reference to FIG. 48.

Figure 48:
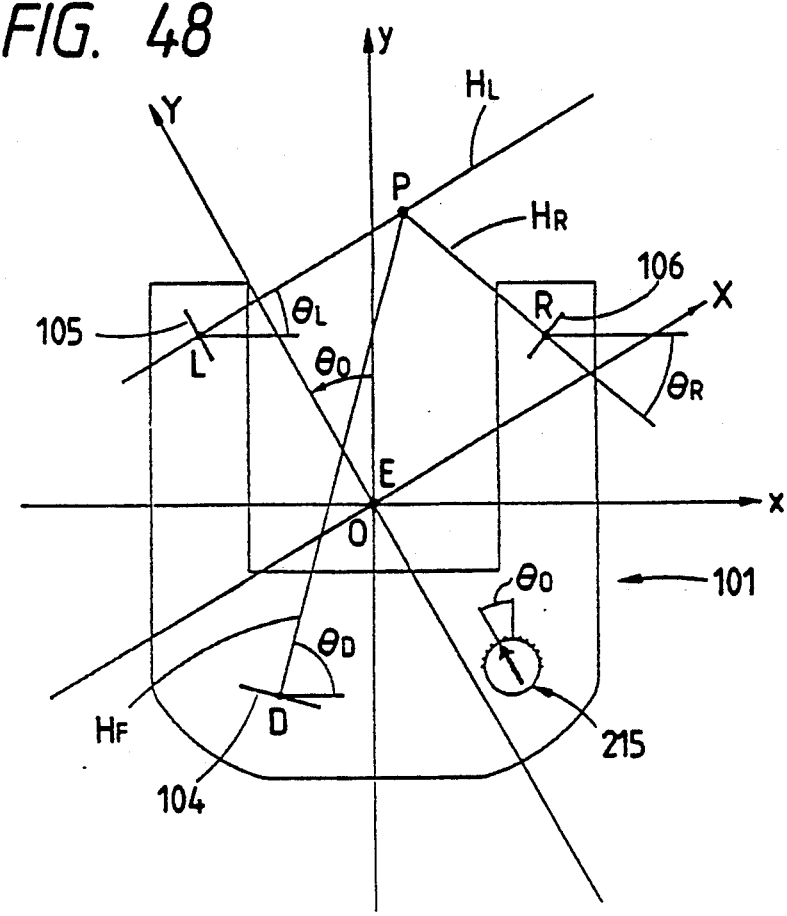
FIG. 48 is a diagram illustrating the calculation in travel mode 4.

It is herein assumed that, as shown in FIG. 48, the travel angle of the forklift 101 is $+\theta_O$ (i.e., Yes in STEP 404 of the flowchart of FIG. 19) and that the steering angle of the drive wheel 104 is $+\theta_D$.

An arbitrarily determined representative point E on the center line of the forklift body is herein designated as the origin of an x-y rectangular coordinate system in which the y-axis coincides with the center line. In this x-y rectangular coordinate system, it is supposed that the steering center L of the left load wheel 105 is indicated by $(x_L, y_L)$, the steering center R of the right load wheel 106 by $(x_R, y_R)$, and the steering center D of the drive wheel 104 by $(x_D, y_D)$.

First, the x-y rectangular coordinate system are rotated by the travel angle $\theta_O$, thereby providing a transformed X-Y coordinate system. Then, the coordinates of the steering centers L, R and D in the transformed X-Y coordinate system, i.e., $(X_L, Y_L)$, $(X_R, Y_R)$ and ($X_D$, $Y_D$) are obtained. These coordinates can be given by Exs. 12 to 14.

$$X_R = x_R \cdot \cos\theta_O + y_R \cdot \sin\theta_O$$

$$Y_R = -x_R \cdot \sin\theta_O + y_R \cdot \cos\theta_O \quad [\text{Ex. 12}]$$

$$X_L = x_L \cdot \cos\theta_O + y_L \cdot \sin\theta_O$$

$$Y_L = -x_L \cdot \sin\theta_O + y_L \cdot \cos\theta_O \quad [\text{Ex. 13}]$$

$$X_D = x_D \cdot \cos\theta_O + y_D \cdot \sin\theta_O$$

$$Y_D = -x_D \cdot \sin\theta_O + y_D \cdot \cos\theta_O \quad [\text{Ex. 14}]$$

Next, the coordinates of the turning center P in the transformed X-Y coordinate system, i.e., ($X_P$, $Y_P$), are calculated. In this calculation, the intersection of the extension line $H_L$ of the left load wheel and the extension line $H_F$ of the drive wheel 104 is obtained as the turning center P.

In the transformed X-Y coordinate system, the extension line $H_L$ of the left load wheel is given by Ex. 15.

$$Y = Y_L \quad [\text{Ex. 15}]$$

The extension line $H_F$ of the drive wheel in the transformed X-Y coordinate system is given by Ex. 16.

$$Y = \tan(\theta_D - \theta_O)X + Y_D - X_D\tan(\theta_D - \theta_O) \quad [\text{Ex. 16}]$$

The coordinates of the intersection of the two straight lines are obtained. It is apparent that the Y-coordinate is $Y_L$. The X-coordinate, i.e., $X_P$, can be given by Ex. 17.

$$X_P = \frac{Y_L - Y_D + X_D \cdot \tan(\theta_D - \theta_O)}{\tan(\theta_D - \theta_O)} \quad [\text{Ex. 17}]$$

The tangent of the difference between the target steering angle $\theta_R$ for the right load wheel 106 and the travel angle $\theta_O$ is obtained by Ex. 18.

$$\tan(\theta_R - \theta_O) = \frac{(Y_R - Y_L)\tan(\theta_D - \theta_O)}{(X_R - X_D)\tan(\theta_D - \theta_O) - Y_L + Y_D} \quad [\text{Ex. 18}]$$

According to Ex. 18, the target steering angle $\theta_R$ for the right load wheel 106 can be obtained by Ex. 19.

$$\theta_R = \tan^{-1}\frac{(Y_R - Y_L)\tan(\theta_D - \theta_O)}{(X_R - X_D)\tan(\theta_D - \theta_O) - Y_L + Y_D} + \theta_O \quad [\text{Ex. 19}]$$

Figure 49:
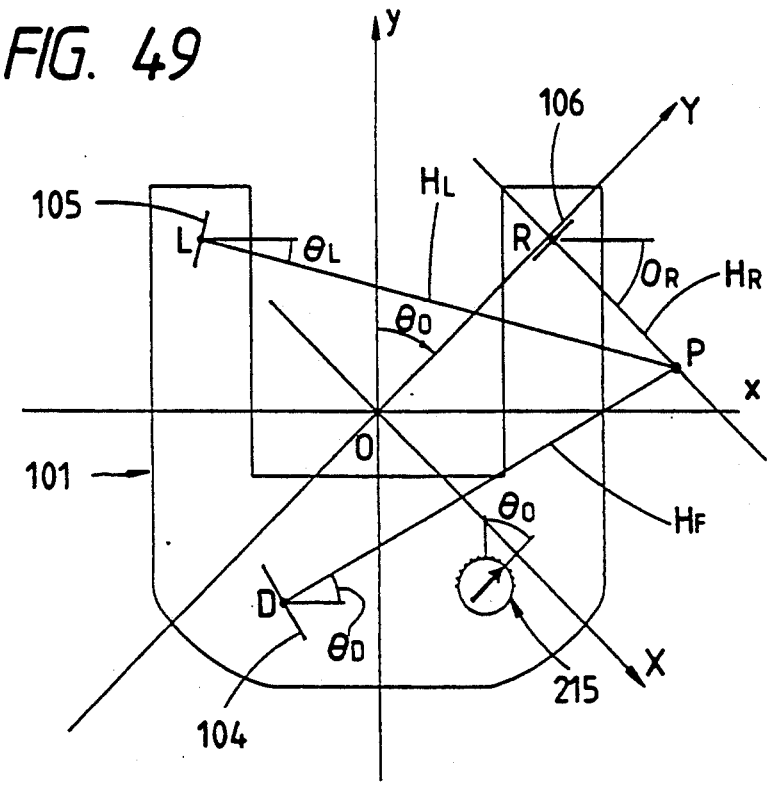
FIG. 49 is a diagram illustrating the calculation in travel mode 4.

Similarly, FIG. 49 shows the forklift 101 in which the travel angle is $-\theta_O$ (i.e., No in STEP 404 of the flowchart of FIG. 19) and the steering angle of the drive wheel 104 is $+\theta_D$. In this case, the extension line H: of the right load wheel 106 in the transformed X-Y coordinate system can be given by Ex. 20.

$$Y = Y_R \quad [\text{Ex. 20}]$$

The extension line H: of the drive wheel 104 in the transformed X-Y coordinate system is given by Ex. 16 in the same manner as described above. The coordinates of the intersection of the two straight lines are obtained. It is apparent that the Y-coordinate is $Y_R$. The X-coordinate can be expressed by Ex. 21.

$$X_P = \frac{Y_R - Y_D + X_D \cdot \tan(\theta_D - \theta_O)}{\tan(\theta_D - \theta_O)} \quad [\text{Ex. 21}]$$

The tangent of the difference between the target steering angle $\theta_L$ for the left load wheel 105 and the travel angle $\theta_O$ is obtained by Ex. 22.

$$\tan(\theta_L - \theta_O) = \frac{(Y_R - Y_L)\tan(\theta_D - \theta_O)}{(X_D - X_L)\tan(\theta_D - \theta_O) + Y_R - Y_D} \quad [\text{Ex. 22}]$$

According to Ex. 22, the target steering angle $\theta_L$ for the left load wheel 105 can be obtained by Ex. 23.

$$\theta_L = \tan^{-1}\frac{(Y_R - Y_L)\tan(\theta_D - \theta_O)}{(X_D - X_L)\tan(\theta_D - \theta_O) + Y_R - Y_D} + \theta_O \quad [\text{Ex. 23}]$$

The coordinates of the steering centers L, R and D of the load wheels 105 and 106 and drive wheel 104, i.e., ($x_L$, $y_L$), ($x_R$, $y_R$) and ($x_D$, $y_D$), etc., are previously stored in the ROM1 131. The origin E of the x-y rectangular coordinate system can be located at a point other than that shown in the above embodiment, and it can be located at various points, including those which are not on the center line of the truck body.

The process for travel mode 5 is effected when the travel mode signal md5 is selected through the select switch 400 (STEP 18). In travel mode 5, the advantages that the travel direction of the forklift can be changed freely, and that the attitude of the body of the forklift can be changed with respect to the changed travel directions can be attained in the same manner as travel mode 4, but the steering sense in travel mode 5 is somewhat different from that of travel mode 4.

According to the invention, the axis G is rotated about an arbitrarily determined representative point of the truck body by an angle input from the travel angle input device 215, and the intersection of the rotated axis G' and the extension line $H_F$ of the drive wheel is set as the turning center P. Hereinafter, a preferred embodiment will be described.

Figure 50:
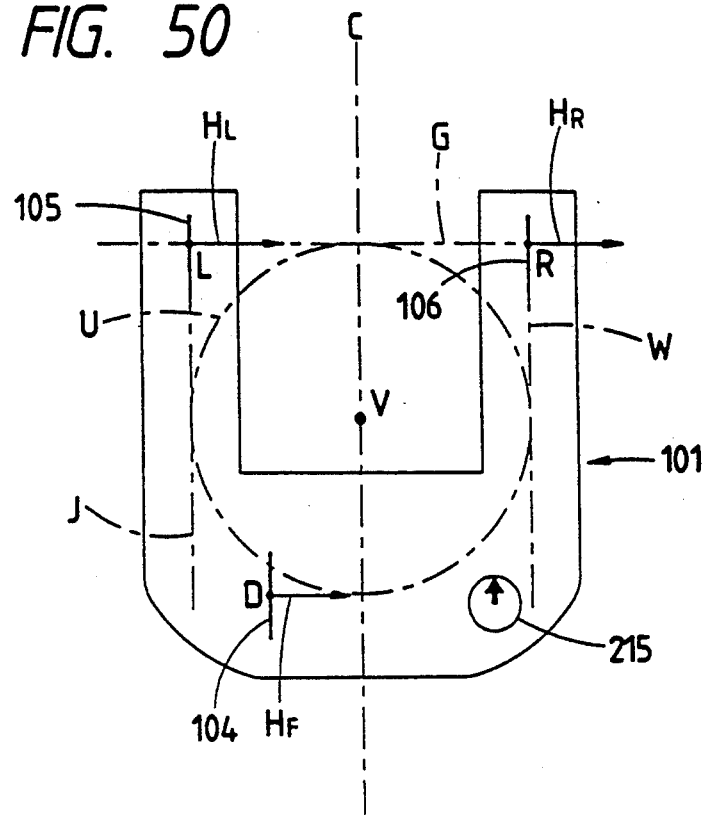
FIG. 50 is a diagram illustrating the basic concept of travel mode 5.

In the embodiment, as shown in FIG. 50, the center of a circle U which is tangent to the axis G and to axes J and W that respectively elongate from the steering centers L and R of the left and right load wheels 105 and 106 is set as the body representative point V.

FIG. 50 shows the initial state in which the steering angles of the left and right load wheels 105 and 106 and drive wheel 104 are zero and the travel angle of the forklift 101 also is zero. Under this state, the axis G is rotated by the travel angle about the body representative point V. Since the travel angle is zero in the embodiment, however, the axis G is not rotated.

The intersection of the axis G and the extension line $H_F$ of the drive wheel elongating from the steering center D of the drive wheel is set as the turning center P (not shown in FIG. 50). In this case, since the steering angle $\theta_D$ of the drive wheel is zero, the theoretical turning center P is a point at infinity on the axis G.

The extension lines $H_L$ and $H_R$ of the left and right load wheels are formed so as to pass the turning center P. The steering is performed while setting the angles respectively formed by the axis G and the extension lines $H_L$ and $H_R$ as the target steering angles for the left and right load wheels 105 and 106. In this case, however, both the target steering angles $\theta_L$ and $\theta_R$ for the left and right load wheels 105 and 106 are zero.

As apparent from the above description, when the travel angle is zero, or when the travel direction S is directed along the body center line C, both the left and right load wheels 105 and 106 are not steered so that the forklift is kept to advance straight, resulting in that the steering operation is the same as that of a conventional reach forklift in which the left and right load wheels 105 and 106 are not turned.

Figure 51:
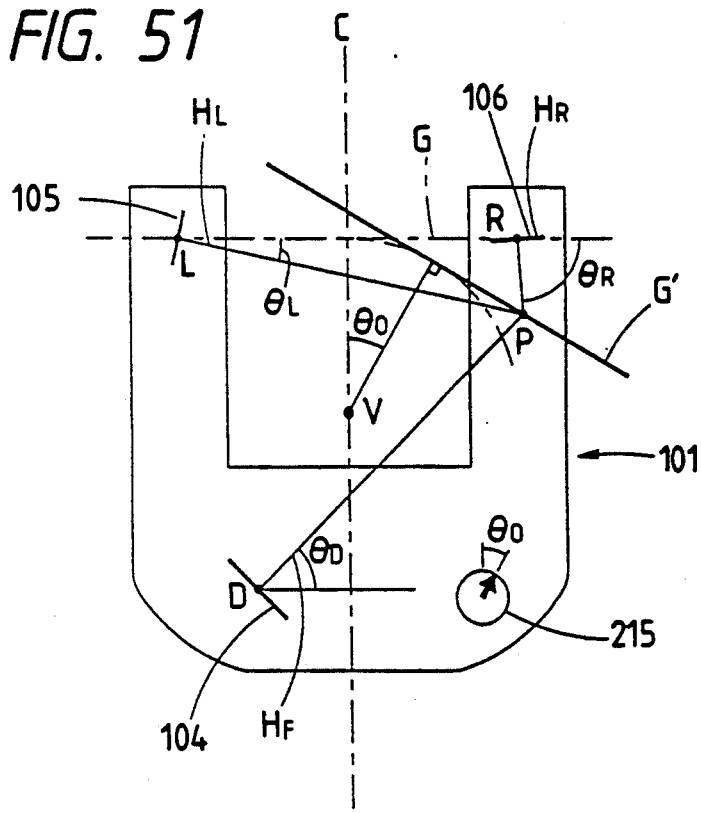
FIG. 51 is a diagram illustrating the basic concept of travel mode 5.

When the travel angle is set to $\theta_O$ in the clockwise direction as shown in FIG. 51, the axis G is rotated by the travel angle $\theta_O$ about the body representative point V to obtain the rotated axis G'. The intersection of the axis G' and the extension line $H_F$ of the drive wheel serves as the turning center P.

The extension lines $H_L$ and $H_R$ of the left and right load wheels are formed so as to pass the turning center P. The steering control is performed while setting the angles $\theta_L$ and $\theta_R$ respectively formed by the unrotated axis G and the extension lines $H_L$ and $H_R$ as the target steering angles for the left and right load wheels 105 and 106.

Figure 52:
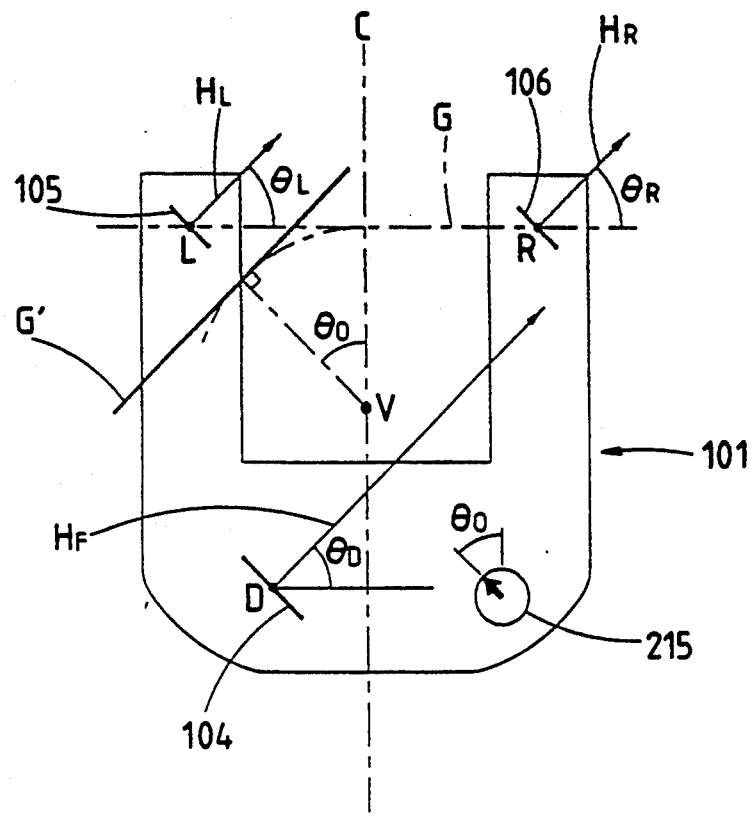
FIG. 52 is a diagram illustrating the basic concept of travel mode 5.

When the travel angle $\theta_O$ is set so as to be equal to the steering angle $\theta_D$ of the drive wheel 104, i.e., $\theta_O = \theta_D$ as shown in FIG. 52, the axis G is rotated by the travel angle $\theta_O$ about the body representative point V to obtain the rotated axis G' in the same manner as the above example, and the intersection of the axis G' and the extension line $H_F$ of the drive wheel serves as the turning center P. Since the axis G' is parallel to the extension line $H_F$ of the drive wheel in this example, the theoretical turning center P (not shown) is a point at infinity on the axis G'.

Accordingly, the steering of the left and right load wheels 105 and 106 is controlled so that the extension lines $H_L$ and $H_R$ of the left and right load wheels pass the turning center P. In this case, both the angles formed by the axis G and the extension lines $H_L$ and $H_R$ of the left and right load wheels, i.e., the target steering angles $\theta_L$ and $\theta_R$ are equal to the travel angle $\theta_O$ and the steering angle $\theta_D$ of the drive wheel 104. In this state, the body attitude of the forklift 101 is not changed so that the forklift 101 travels diagonally in the direction of the travel angle $\theta_D$ while maintaining its body direction.

Figure 20:
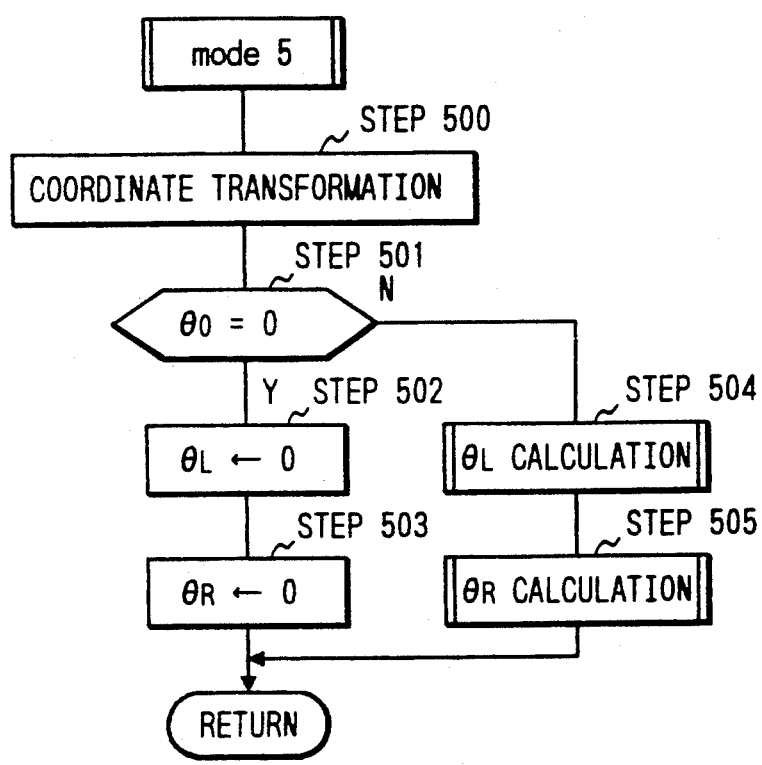
FIG. 20 is a flowchart showing the process procedure of travel mode 5.

Specific means which embodies the above concept will be described with reference to the flowchart of FIG. 20.

First, reference coordinate axes are subjected to a coordinate transformation to be rotated by the travel angle $\theta_O$ (STEP 500). Then, when the travel angle is zero (Yes in STEP 501), both the target steering angles $\theta_L$ and $\theta_R$ for the left and right load wheels are set to zero (STEPs 502 and 503).

In contrast, when the travel angle $\theta_O$ is not zero (No in STEP 501), the target steering angles $\theta_L$ and $\theta_R$ for the left and right load wheels are calculated (STEPs 504 and 505).

The coordinate transformation in STEP 500 can be executed by above-described Exs. 12 to 14, and STEPs 504 and 505 are already described in conjunction with the travel mode 4. Therefore, their description is omitted herein.

The process procedure of the slave CPU 139 which has received the target steering angles $\theta_L$ and $\theta_R$ for the left and right load wheels determined depending on the selected travel mode will be described with reference to the flowchart of FIG. 23.

First, the RAM2 138 and hardware components such as the I/O devices are initialized (STEPs 600 and 601), and the steering end process for the drive wheel 104 which is enclosed by broken lines in the figure is conducted. This process will be described later.

On the basis of the deviation between the target steering angle $\theta_L$ for the left load wheel sent from the master control section 116A and the actual steering angle $\theta_L'$, the chopper rate of the steering motor 111 for steering the left load wheel 105 is calculated and then converted to a corresponding analog value. The analog chopper rate is sent to the D/A converter 142 (STEP 613).

Similarly, on the basis of the deviation between the target steering angle $\theta_R$ for the right load wheel and the actual steering angle $\theta_R'$, the chopper rate of the steering motor 112 for steering the right load wheel 106 is calculated and then converted to a corresponding analog value. The analog chopper rate is sent to the D/A converter 143 (STEP 614).

In response to the instruction from the master CPU 133, transmitting or receiving arbitrary data are set, and the data are subjected to the communication through the SIO 134 of the master control section 116A (STEP 615).

The signal transmitted from the steering control section 116B to the master control section 116A is the steering angle $\theta_D$ for the drive wheel, and the signals transmitted from the master control section 116A to the steering control section 116B include the target steering angles $\theta_L$ and $\theta_R$ for the left and right load wheels, and the left and right steering ends $\theta_{DR}$ and $\theta_{DL}$ for the drive wheel.

Next, the steering end process for the drive wheel 104 which is enclosed by the broken lines in FIG. 23 will be described.

According to the invention, the steering end of the drive wheel 104 can be freely changed using the power steering motor 312 mounted in the forklift 101.

In each of the travel modes, the steering angle of the drive wheel must be restricted within a predetermined range.

Hereinafter, the configuration for restricting the steering angle $\theta_D$ for the drive wheel 104 within a predetermined range will be described in detail.

Figure 15:
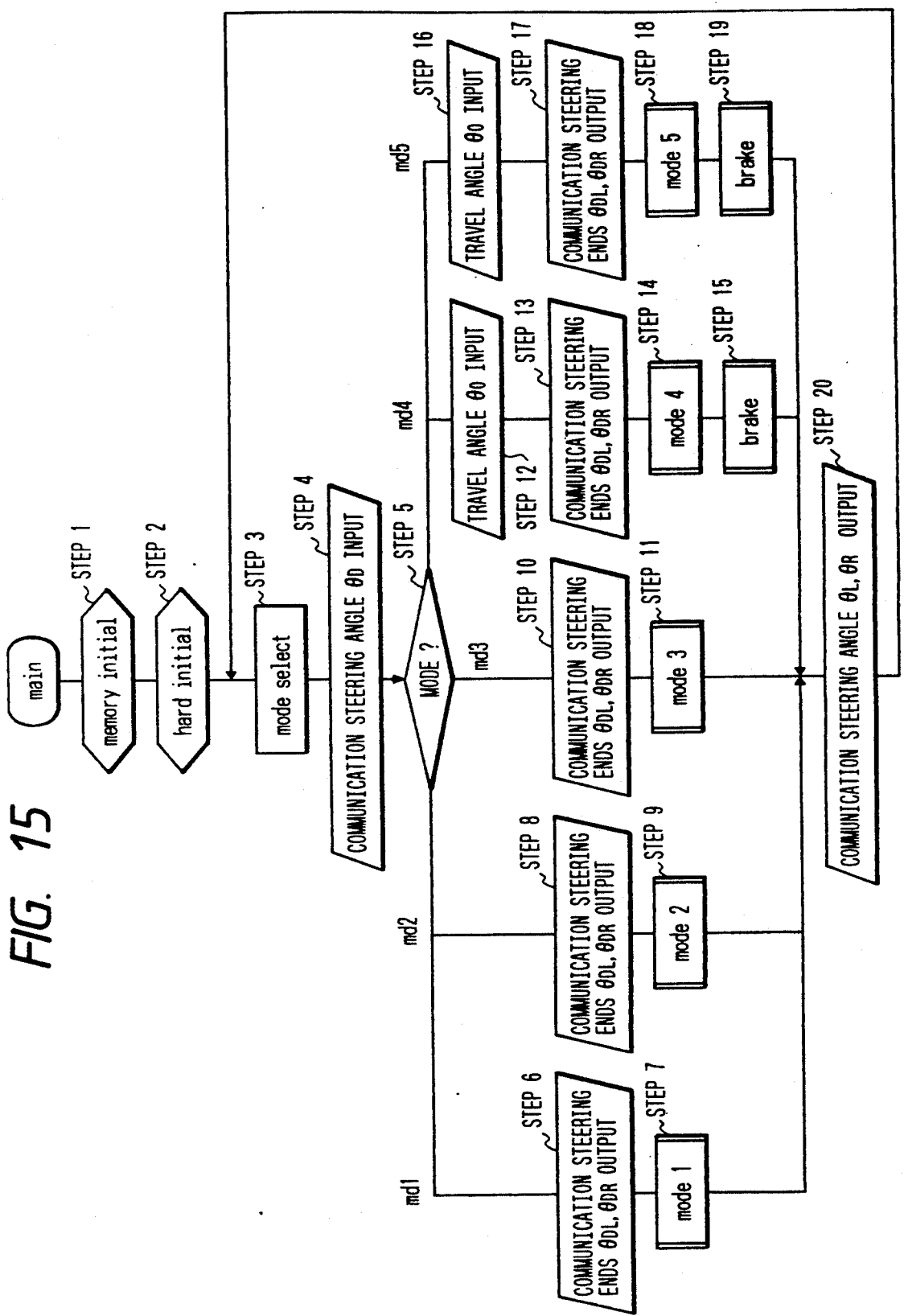
FIG. 15 is a flowchart showing the process procedure of a master CPU.

As described in conjunction with FIG. 15, when any of the travel modes is selected through the select switch 400, the steering end signals $\theta_{DL}$ and $\theta_{DR}$ for the drive wheel 104 are read out from ROM1 131, and the read-out signals are transmitted from the SIO 134 of the master control section 116A to the SIO 140 of the steering control section 116B.

Figure 23:
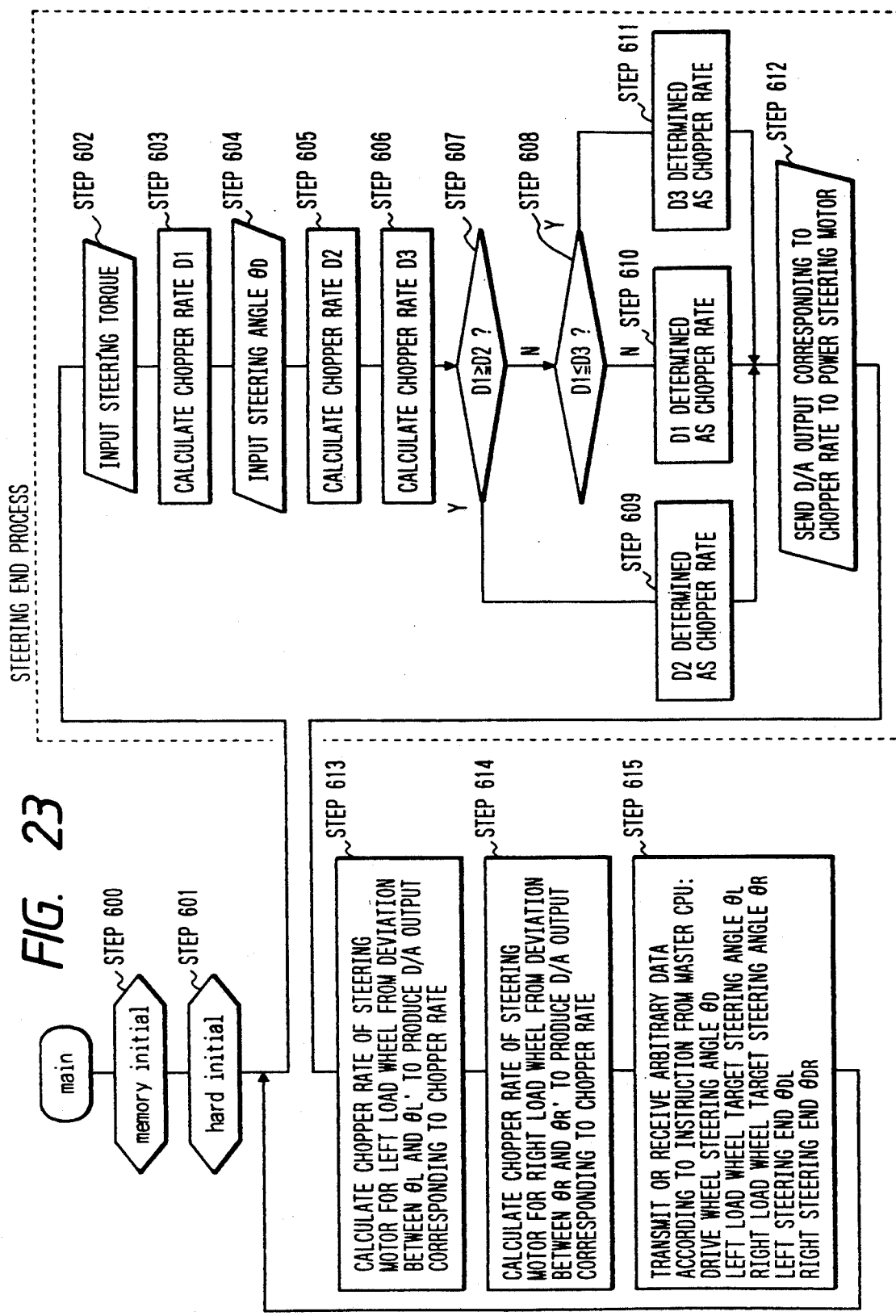
FIG. 23 is a flowchart showing the process procedure of a slave CPU.

The portion of FIG. 23 enclosed by the broken lines shows the process procedure of the invention. Initially, the steering torque signal T indicative of the torque applied to the steering wheel 103 is input (STEP 602), and the chopper rate D1 of the power steering motor 312 is calculated (STEP 603).

Figure 53:
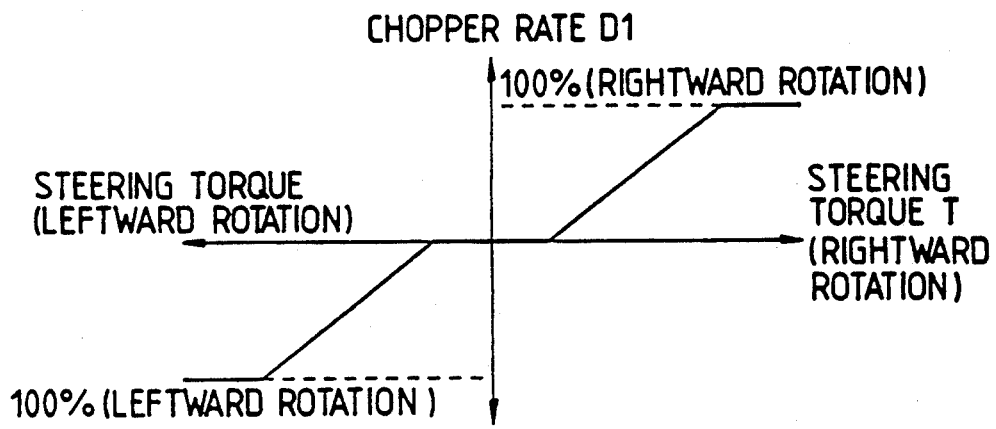
FIG. 53 is a diagram showing the relationship between a steering torque and a chopper rate for driving a power steering motor.

The chopper rate D1, which can be derived from FIG. 53, is set so that, when the steering torque signal T or the rotational direction of the steering wheel 103 indicates the rightward turning, the power steering motor 312 rotates in the same direction or rightward, and in proportion to the steering torque.

Furthermore, a dead zone is provided so that, when the absolute value of the steering torque is greater than a predetermined value, the absolute value of the chopper rate D1 is set to 100% at the maximum, and that, when the absolute value of the steering torque is smaller than a predetermined value, the chopper rate D1 is set to zero in order to prevent the hunting of the power steering motor 312 from occurring. It is assumed that the chopper rate for the rightward rotation of the power steering motor 312 has the positive sign and that for the leftward rotation has the negative sign.

Then, the slave CPU 139 receives the current steering angle $\theta_D$ of the drive wheel 104 from the A/D converter (STEP 604), and calculates chopper rates D2 and D3 of the power steering motor 312 which are determined from the current steering angle $\theta_D$ (STEPs 605 and 606).

The chopper rates D2 and D3 are respectively used to restrict the left and right steering ends within the allowable output range of a chopper rate for driving the power steering motor 312. The chopper rates D2 and D3 will be described with reference to FIG. 54.

In the figure, the abscissa indicates the steering angle $\theta_D$ of the drive wheel 104, and the ordinate indicates the chopper rate for driving the power steering motor 312. The left and right ends of the abscissa correspond to the steering ends for the drive wheel 104 which are mechanically formed. In this example, variable steering ends are set inside the mechanical steering ends and within the range of the steering ends $\theta_{DL}$ to $\theta_{DR}$, in accordance with the selected travel mode. The mechanical steering ends should be considered as illustrative, and are not necessary to be always formed.

The chopper rate D2 is zero at the right steering end $\theta_{DR}$ of the drive wheel, and gradually increases when the steering angle increases from this point toward the left end, so that the chopper rate can be 100% or the output can be increased to full power until the steering angle reaches the mechanical left steering end.

When the steering angle $\theta_D$ of the drive wheel further increases from the right steering end $\theta_{DR}$ toward the right end, the chopper rate opposite to this direction, i.e., the negative chopper rate for rotating the power steering motor 312 leftward is output. In this example, the chopper rate of $-80\%$ is output at the mechanical right steering end.

The chopper rate D3 restricts the left steering end $\theta_{DL}$ of the allowable output range of a chopper rate for driving the power steering motor 312.

The chopper rate D3 is zero at the left steering end $\theta_{DL}$ for the drive wheel 104, and linearly increases when the steering angle increases from this point toward the right end, so that the power steering motor can be driven to rotate leftward at 100% output.

When the steering angle $\theta_D$ of the drive wheel further increases from the left steering end $\theta_{DL}$ toward the left end, the chopper rate opposite to this direction, i.e., the chopper rate for rotating the power steering motor 312 rightward is output. In this example, the chopper rate of 80% is output at the mechanical left steering end.

Next, the procedure of finally determining the chopper rate for driving the power steering motor, from the chopper rates D1, D2 and D3 (STEPs 607 to 611) will be described.

First, the chopper rate D1 obtained in relation to the steering torque signal T indicative of the torque applied to the steering wheel 103 is compared with the chopper rate D2 obtained in relation to the steering angle $\theta_D$ of the drive wheel (STEP 607). When the chopper rate D1 is greater than the chopper rate D2 (Yes in STEP 607), the chopper rate D2 is determined as the chopper rate for driving the power steering motor 312 (STEP 609).

In contrast, when the chopper rate D2 is greater than the chopper rate D1 (No in STEP 607), the chopper rate D1 is further compared with the chopper rate D3 (STEP 608). When the chopper rate D1 is smaller than the chopper rate D3 (Yes in STEP 608), it is finally determined that the chopper rate D3 is used (STEP 611). When the chopper rate D1 is greater than the chopper rate D3 (No in STEP 608), the chopper rate D1 is used (STEP 610).

From the above, it will be seen that the area enclosed by the curves defining the chopper rates D2 and D3 (the hatched area in FIG. 54) indicates the allowable output range of the chopper rate for driving the power steering motor according to the steering angle $\theta_D$ of the drive wheel.

For example, a state is supposed where the steering wheel 103 is rotated rightward from the neutral position and the drive wheel is gradually approaching the right steering end $\theta_{DR}$. In this state, even when the steering torque is applied in either of the left and right directions, the chopper rate D1 corresponding to the steering torque signal can be output as far as that the steering angle $\theta_D$ is smaller than $\theta_S$.

Figure 54:
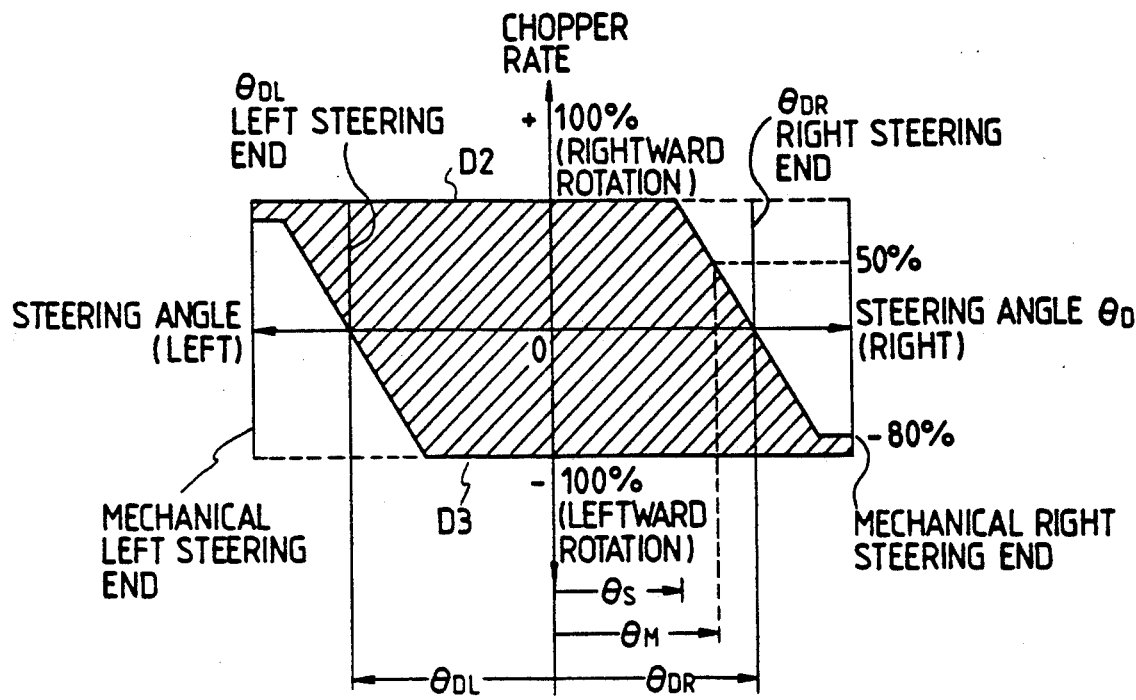
FIG. 54 is a diagram showing the relationship between a steering angle and a chopper rate for driving a power steering motor.

When the steering angle exceeds $\theta_S$ and the rightward steering torque or the steering torque in the direction oriented to the right variable steering end is applied, however, the following phenomenon will be observed. Namely, even in the case where the chopper rate D1 depending on the steering torque signal indicates $+100\%$, for example, the steering angle of $\theta_M$ causes the chopper rate to be less than the value indicated by D2 (in this example, $+50\%$ at the maximum) as shown in FIG. 54.

Therefore, the gradually increasing steering reaction is applied to the arm of the operator operating the steering wheel 103, whereby the steering becomes heavy. This reaction increases linearly as the drive wheel 104 approaches the right steering end $\theta_{DR}$.

When the steering wheel 103 is further rotated rightward against the heavy steering reaction, the chopper rate at the steering angle of $\theta_{DR}$ of the drive wheel has the value indicated by D2 or is zero even in the case where the chopper rate D1 indicates $+100\%$ in the same manner as described above. This results in that any assist torque is not applied to the steering wheel 103.

When the operator tries to further rotate the steering wheel 103 in the right direction, a positive value is calculated as the chopper rate D1 as described above, and the steering angle momentarily tries to exceed $\theta_{DR}$. However, the chopper rate is finally determined as D2 or a negative value, resulting in that the power steering motor 312 is driven to rotate leftward.

This acts in the direction opposite to that in which the steering wheel 103 is rotated, so that the drive wheel 104 is controlled so as not to be further steered. In this way, the steering reaction of the steering wheel 103 is gradually increased before the steering end $\theta_{DR}$, and, when the steering is tried to exceed the steering end $\theta_{DR}$, the power steering motor 312 generates torque which corresponds and is opposite in direction to the steering torque. Accordingly, the steering angle $\theta_D$ of the drive wheel can be controlled so as to be surely restricted to the steering end.

The above-described operation is also conducted for the left variable steering end in the same manner.

The invention is not limited to the embodiment described above, and can be variously modified within the spirit of the invention. In the above, an example in which the chopper rate is linearly changed has been described. It is needless to say that the chopper rate may be changed in various manners, for example, in the manner of a quadratic function or a cubic function.

Next, a still further embodiment of the invention will be described. The invention relates to a braking process which is conducted when travel mode 4 or 5 is selected (STEP 15 or 19 in FIG. 15), and prevents the change of attitude of the truck body which often occurs during the braking in the prior art, from occurring.

In the forklift 101, as described above, only the drive wheel 104 is provided with a braking device, and the left and right load wheels 105 and 106 are constructed so as to be freely turned or constituted as a free wheel or caster. Therefore, particularly when the forklift brakes hard during the truck travels with the travel angle of the lateral direction as shown in FIG. 44, the left and right load wheels 105 and 106 turn about the contact point between the drive wheel 104 and the road surface, thereby arising a problem that the attitude angle of the forklift 101 is largely changed.

This problem is very serious for a forklift which must be correctly positioned with respect to a load. Hereinafter, means for solving this problem will be described in detail.

Figure 55:
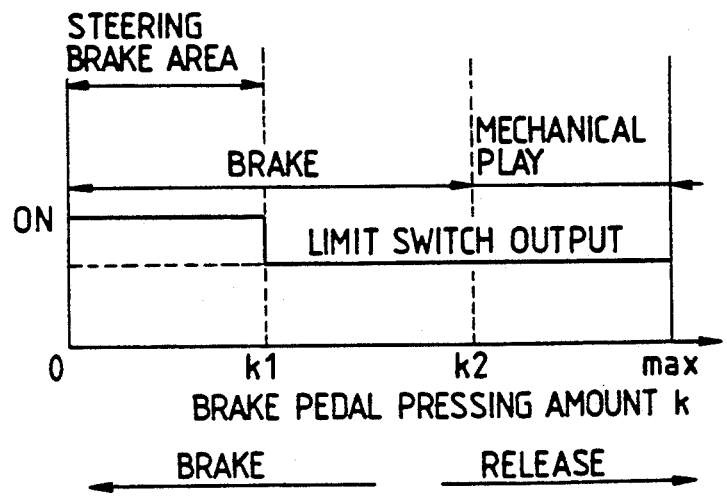
FIG. 55 is a diagram showing the relationship between the operation of the limit switch and the pressing amount of a brake pedal.
Figure 57:
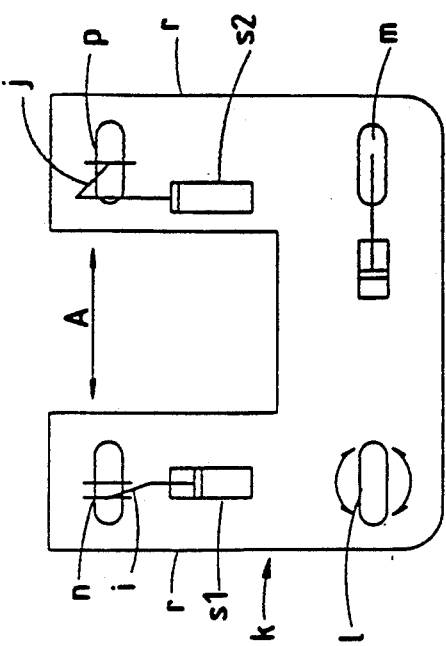
FIG. 57 is a diagram illustrating a conventional multi-directional vehicle.
Figure 58:
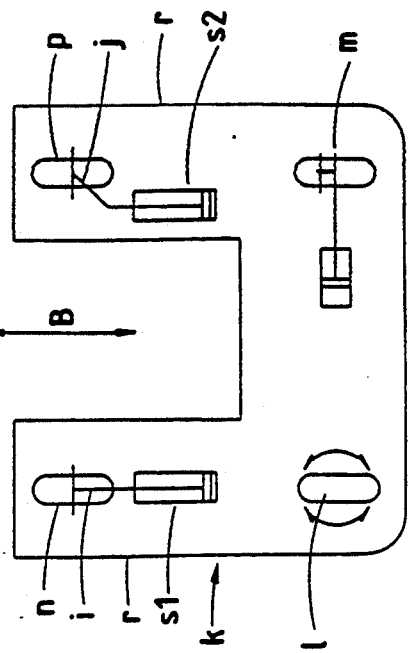
FIG. 58 is a diagram illustrating a conventional multi-directional vehicle.

FIG. 55 shows the relationship between the pressing amount of the brake pedal 222 and the output of the limit switch 223. In FIG. 55, when the pressing amount of the brake pedal 222 is at "max" or the brake pedal 222 is fully pressed down, the brake is released as described above.

When the operator's foot is gradually raised so that the pressing amount k of the brake pedal 222 is reduced from the "max" state to its lower level, the brake device produces in accordance with the level the braking action between the drive wheel 104 and the road surface, as described above. The range of the pressing amount k of the brake pedal 222 from "max" to k2 (or k2<k) corresponds to a so-called mechanical play stroke.

Then, when the operator's foot is further raised so that the pressing amount k of the brake pedal 222 is less than k2, the brake device applies to the drive wheel 104 the braking operation the level of which is inversely proportional to the pressing amount. When the operator's foot is still further raised so that the pressing amount k of the brake pedal 222 is less than k1 (k1>k), the braking operation of the brake device applied to the drive wheel 104 is increased in level, and the limit switch 223 is turned ON to exert the braking operation according to the invention as described below.

Figure 22:
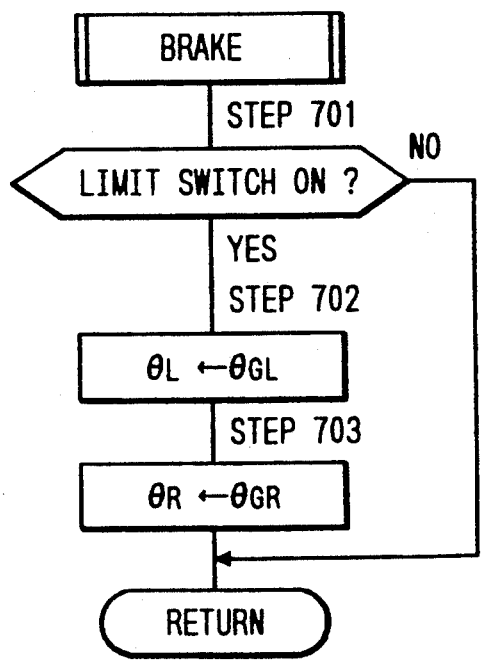
FIG. 22 is a flowchart showing the process procedure of the braking according to the invention.

The procedure of the braking operation is shown in FIG. 22. Initially, the state of the limit switch 223 for detecting the pressing state of the brake pedal 222 is checked to judge whether the limit switch 223 is ON or not (STEP 701).

When the limit switch 223 is OFF (No in STEP 701), the target steering angles $\theta_L$ and $\theta_R$ for the left and right load wheels which have been calculated by the master CPU 133 in STEPs 14 and 18 are employed as they are.

In contrast, when the limit switch 223 is ON (Yes in STEP 701), the target steering angles $\theta_L$ and $\theta_R$ for the left and right load wheels 105 and 106 are set to arbitrarily determined fixed angles $\theta_{GL}$ and $\theta_{GR}$, respectively (STEPs 702 and 703).

Figure 56:
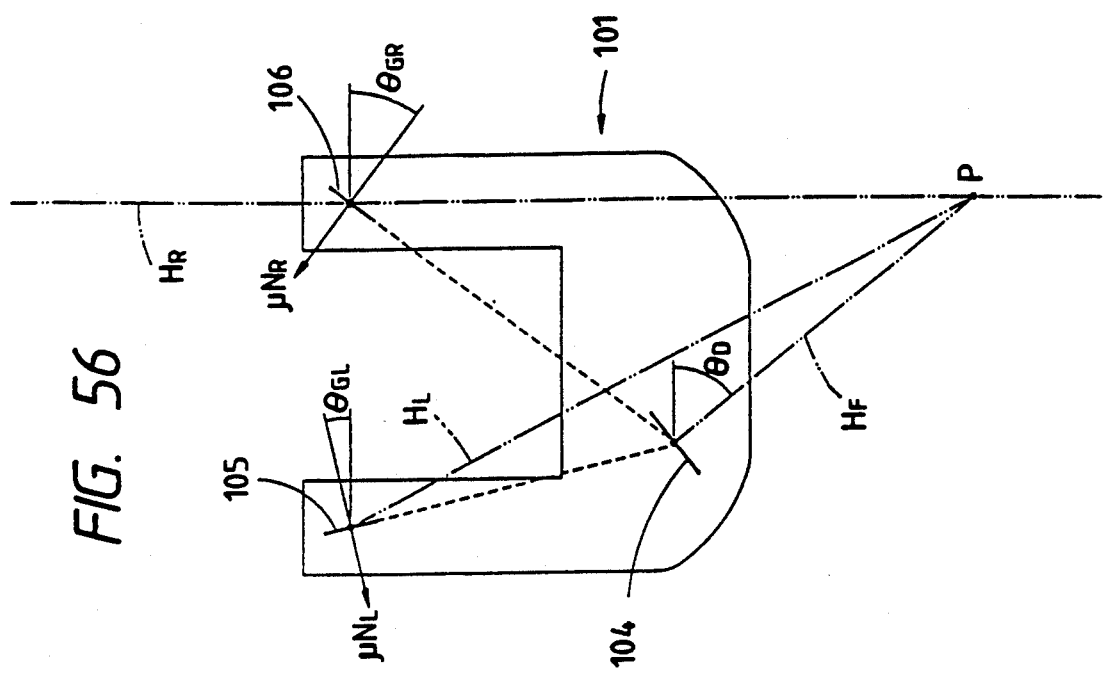
FIG. 56 is a diagram illustrating fixed angles of target steering angles of left and right load wheels.

For example, the fixed angles $\theta_{GL}$ and $\theta_{GR}$ which are set as the target steering angles of the left and right load wheels 105 and 106 are those shown in FIG. 56. That is, the fixed angles may be selected as angles by which the travel directions of the left and right load wheels (indicated by broken lines in FIG. 56) can pass the steering center D of the drive wheel.

Under this state, even when the force of inertia is applied to the center of gravity of the forklift 101 so as to turn the truck body about the contact point between the drive wheel 104 and the road surface, a friction force of $(\mu N_L + \mu N_R)$ is generated between the road surface and the left and right load wheels 105 and 106 because the load wheels are steered to the state in which they cannot be turned, thereby suppressing the change of the attitude of the forklift as much as possible. In the above expression, $\mu$ is the coefficient of friction between the road surface and the left and right load wheels 105 and 106, and $N_L$ and $N_R$ are normal forces applied from the left and right load wheels 105 and 106.

It should not be understood that the fixed angles for the target steering angles of the left and right load wheels 105 and 106 which are employed in a braking state are limited to those of the above-described embodiment. This is because that, for the suppression of the change of the attitude of the body of the forklift 101 during a braking operation, it is sufficient to inhibit Ackerman steering from being conducted at that instance. The case described above is an example in which the maximum braking effect can be attained. Hence, the fixed angles for the steering angles of the left and right load wheels can be arbitrarily selected as far as they are not based on Ackerman steering.

In this example, fixed angles for both the left and right load wheels 105 and 106 are output. Alternatively, only a fixed angle for either of the load wheels may be output. In this alternative, either of STEPs 702 and 703 in the procedure of FIG. 22 may be omitted.

According to one aspect of the invention, a reach forklift is provided in which the steering of load wheels supported at ends of straddle arms can be realized without increasing the width of the straddle arms or with an extremely reduced width of the straddle arms.

Since the steering axes of the load wheels are offset toward the outside of the truck body, a sufficient wheelbase can be obtained even when the forklift moves laterally, thereby attaining an excellent travel stability and improving the riding comfortableness. Moreover, this allows the steering torque of the load wheels to be reduced and the steering motor to be miniaturized.

The configuration in which components, such as steering motors, timing pulleys, and steering shafts can be housed in the straddle arms prevents a foreign material from entering the inside of the truck body, thereby preventing the gears and timing belts from being damaged.

According to another aspect of the invention, the load wheels are disposed inside the truck body without being restricted by guide rail members of load-carrying means. Therefore, the width of the straddle arms can be reduced. This leads to the reduction of the body size of a reach forklift in which load wheels can be steered.

Since the lower plate is cut out, the offset distance can be set to a substantially same value as that of a conventional forklift in spite of the reduced width of the width of the straddle arms. Therefore, a sufficient wheelbase can be obtained even when the forklift moves laterally, thereby attaining an excellent travel stability and improving the riding comfortableness.

According to a further aspect of the invention, while operating a reach forklift on the basis of the driverbility of an ordinary reach forklift, the turning center can be gradually moved to the center of the body of the forklift, in accordance with the operation of the steering wheel, whereby the forklift can turn with a very smaller turning radius than that required in the prior art. Accordingly, the area of pathways in a warehouse can be reduced, and this reduced area produces an effect that the space for storing cargoes can be made large.

Since either of the left and right load wheels can be surely controlled in proportion to the steering angle of the drive wheel, the steering angle of one of the left and right load wheels is prevented from being abruptly changed, so that the steering control is stably performed. Furthermore, since the theory of Ackerman-Jeantaud can be satisfied in any travel condition, the load wheels are prevented to the utmost from slipping, so that the steering can be done smoothly.

Moreover, the minimum turning center can be easily changed in various manners so that the driverbility in accordance with the use of a forklift, thereby providing a forklift with an extremely high degree of extendibility.

According to a still further aspect of the invention, only when the steering angle of the drive wheel is within a predetermined range, the steering angle is multiplied by a steering angle gain and the left and right load wheels are steered. Accordingly, the steering of both the left and right load wheels can be controlled so as to be substantially proportional to the steering angle of the drive wheel. This prevents the load wheels from being abruptly steered, and reduces the power consumption of the steering motors for driving the load wheels.

Also in a still further aspect of the invention, in accordance with the steering operation of the steering wheel, the turning center can be gradually moved to the center of the body of the reach forklift. When the steering angle of the drive wheel is relatively small, the turning center is kept below the axis passing the steering centers of the left and right load wheels, whereby feeling of steering operation is improved and the turning radius is made small so that the forklift can make a small turn.

When the steering angle of the drive wheel becomes relatively large, the locus of the turning center is smoothly moved to the minimum turning center through the steering centers of the load wheels. Accordingly, abrupt changes in the steering operation of the load wheels can be prevented, and the forklift can be turned with an extremely small turning radius.

In a still further aspect of the invention, discontinuous operations such as an operation of changing the mode are not required and the travel direction can be continuously changed to any direction. Accordingly, irrespective of the actual direction of the body of the forklift, the direction of the body of the forklift can be corrected while using an arbitrary travel direction as the reference. Therefore, the area necessary for the forklift to travel can be minimized so as to reduce the space for pathways in a warehouse.

According to a still further aspect of the invention, the steering position can be restricted without using any mechanical contact. Therefore, stoppers and butting members to be contacted therewith which are used in a prior art are entirely unnecessary, thereby providing a power steering device which is very advantageous also in the economical view point.

Furthermore, the steering reaction of the steering wheel is gradually increased before the steering end, and, when the steering is tried to exceed the steering end, the power steering motor generates torque which corresponds in level and is opposite in direction to the steering torque. Accordingly, the invention can achieve the further effects that the steering position can be restricted without producing a feeling of artificiality, and that the level of a shock produced at the steering ends can be reduced.

Unlike the prior art in which the steering ends are fixed, it is possible to variously change the positions of the steering ends in accordance with the selected travel mode.

According to a still further aspect of the invention, the change in the attitude angle of a forklift which often occurs during the braking in the prior art can be prevented from occurring by a friction force generated through the left and right load wheels. Thus, the forklift can be correctly positioned with respect to a load, which contributes to the improvement in the efficiency of cargo work. Since not only the drive wheel but also load wheels are subjected to the braking operation, the braking distance can be shortened so as to ensure safety cargo work.

In the travel modes described above, the theory of Ackerman-Jeantaud can be satisfied in any travel condition. Accordingly, the load wheels can be prevented to the utmost from slipping, so that the steering can be done smoothly.

What is claimed is:

1. A reach forklift comprising:
   a forklift body;
   left and right straddle arms;
   a pair of load wheels supported in a steerable manner in the vicinity of front ends of said left and right straddle arms, respectively;
   driving means for steering said load wheels, said load wheels and said driving means being housed in said straddle arms;
   a drive wheel disposed in a rear portion of said forklift body; and
   a steering wheel for steering said drive wheel;
   steering angle detecting means for detecting steering angles of said left and right load wheels and said drive wheel,
   wherein each of said left and right straddle arms comprises:
   a bracket which rotatably supports a steering shaft, the center of said steering shaft being positioned at an outer position in the width direction of said forklift body, said bracket being fixed to a lower face of said steering shaft, supporting said load wheels at an outer position of said forklift body, and rotatably supporting the center of said load wheel in the width direction of said load wheel, said center of said load wheel being separated from said center of said steering shaft by a predetermined distance;
   a gear which is fixed to said bracket and formed into a sector shape, the arc portion of said sector gear being directed to the center of said forklift; and
   a driving gear which engages with said sector gear and is driven by said driving means, said driving gear being positioned in the side of the center of said forklift.

2. A reach forklift according to claim 1, wherein upper and lower grooves are formed inside each of said left and right straddle arms, the front end of said lower groove is positioned behind that of said upper groove in a range where said lower groove does not interfere with the steering of each of said load wheels, a front roller rolls in said upper groove, and a rear roller rolls in said lower groove, said front and rear rollers being rotatably attached to a carriage for supporting a mast which can move back and forth.

3. A reach forklift comprising:
left and right straddle arms;
load wheels supported in a steerable manner in the vicinity of the front ends of said left and right straddle arms, respectively;
driving means for steering said load wheels, said load wheels and driving means being housed in said straddle arms;
a forklift body;
a drive wheel which is steered by a steering wheel and disposed in a rear portion of said forklift body; and
steering angle detecting means for detecting steering angles of said left and right load wheels and said drive wheel,
wherein said forklift further comprises a control device for determining a steering angle of one of said load wheels by multiplying a steering angle of said drive wheel by an arbitrarily predetermined steering angle gain, for calculating a turning center from a geometric relationship between said drive wheel and said one load wheel, and for controlling the steering so that an extension line of the rotation axis of the other load wheel passes said turning center.

4. A reach forklift according to claim 3, wherein said control device performs the multiplication only when an extension line of the rotation axis of said drive wheel can exist on or between steering centers of said left and right load wheels.

5. A reach forklift comprising:
left and right straddle arms;
load wheels supported in a steerable manner in the vicinity of the front ends of said left and right straddle arms, respectively;
driving means for steering said load wheels, said load wheels and driving means being housed in said straddle arms;
a forklift body;
a drive wheel which is steered by a steering wheel and disposed in the rear portion of said forklift body; and
steering angle detecting means for detecting steering angles of said left and right load wheels and said drive wheel,
wherein said forklift further comprises a control device for controlling steering angles of said left and right load wheels so that a locus of a turning center of said forklift passes at least an arbitrarily determined minimum turning center and steering centers of said left and right load wheels, gradually approaches a straight line which elongates from said steering centers of said left and right load wheels toward the outside of said forklift body, and forms a curve smoothly connecting said centers.

6. A reach forklift comprising:
left and right straddle arms;
load wheels respectively supported in a steerable manner in the vicinity of front ends of said left and right straddle arms;
driving means for steering said load wheels, said load wheels and driving means being housed in said straddle arms;
a drive wheel which is steered by a steering wheel and disposed in the rear portion of the body of said reach forklift; and
steering angle detecting means for detecting steering angles of said left and right load wheels and said drive wheel,
wherein said forklift further comprises:
travel angle input means for indicating a travel angle which is formed by a reference direction elongating along the center line of the body and an arbitrarily determined travel direction; and
a control device for, when said travel angle is in the right side of said reference direction, making the steering angle of said right load wheel coincident with said travel angle, for, when said travel angle is in the left side of said reference direction, making the steering angle of said left load wheel coincident with said travel angle, for calculating a turning center of the body from a geometric relationship between said determined one of said left and right load wheels and said drive wheel, and for controlling the steering of said left and right load wheels so that an extension line of the rotation axis of the other load wheel passes said turning center.

7. A reach forklift comprising:
left and right straddle arms;
load wheels respectively supported in a steerable manner in the vicinity of front ends of said left and right straddle arms;
driving means for steering said load wheels, said load wheels and driving means being housed in said straddle arms;
a forklift body;
a drive wheel which is steered by a steering wheel and disposed in the rear portion of said forklift body; and
steering angle detecting means for detecting steering angles of said left and right load wheels and said drive wheel,
wherein said forklift further comprises:
travel angle input means for indicating a travel angle of said forklift body; and
a control device for supposing an axis which passes the steering centers of said left and right load wheels and on which a turning center exists, for rotating said axis on which said turning center exists by the travel angle indicated by said travel angle input means, about an arbitrarily determined representative body point, for setting an intersection of said rotated axis on which said turning center exists and an axis which elongates from the steering center of said drive wheel and along the steering angle of said drive wheel, as a turning center, for determining an axis which connects said turning center with the steering centers of said left and right load wheels, and for performing the steering while using an angle formed by said axis which connects said turning center with the steering centers of said left and right load wheels and said axis on which said turning center before rotation exists, as the steering angle of said left and right load wheels.

8. A reach forklift comprising:
left and right straddle arms;
load wheels respectively supported in a steerable manner in the vicinity of front ends of said left and right straddle arms;

driving means for steering said load wheels, said load wheels and driving means being housed in said straddle arms;

a forklift body;

a drive wheel which is steered by a steering wheel and disposed in the rear portion of said forklift body; and steering angle detecting means for detecting steering angles of said left and right load wheels and said drive wheel, wherein said forklift further comprises a power steering device comprising:

a steering torque detection device for detecting the degree and direction of steering torque applied to said steering wheel;

a power steering motor which is disposed so as to provide assist torque to said drive wheel;

a power steering control device for driving said power steering motor to rotate, said power steering control device comprising a storage portion for storing left and right steering ends of said drive wheel which are arbitrarily determined;

means for calculating a first chopper rate which coincides with the direction of a torque signal obtained by said steering torque detection device and which is substantially proportional to the degree of said torque signal;

means for calculating second and third chopper rates by which, as a steering angle signal obtained by said steering angle detecting means approaches one of said left and right steering ends, said power steering motor is driven to rotate in the direction opposite to the direction toward said one of said left and right steering ends; and means for comparing said first chopper rate with said second and third chopper rates to determine one chopper rate, said power steering motor being driven by said determined one chopper rate.

9. A reach forklift comprising:

left and right straddle arms;

load wheels respectively supported in a steerable manner in the vicinity of front ends of said left and right straddle arms;

driving means for steering said load wheels, said load wheels and driving means being housed in said straddle arms;

a forklift body;

a drive wheel which is steered by a steering wheel and disposed in the rear portion of said forklift body; and steering angle detecting means for detecting steering angles of said left and right load wheels and said drive wheel, wherein said forklift further comprises:

brake operation detecting means for detecting a brake operation in said forklift; and a control device for, during a normal travel, controlling said left and right load wheels so as to perform Ackerman steering, and for, when said brake operation detecting means detects a brake operation, controlling at least one of said left and right load wheels so as not to perform Ackerman steering.

* * * * *